US012582962B2

(12) United States Patent
Baddour et al.

(10) Patent No.: US 12,582,962 B2
(45) Date of Patent: Mar. 24, 2026

(54) FLUIDIC SYSTEMS AND METHODS FOR THE MANUFACTURE OF NANOPARTICLES

(71) Applicant: Alliance for Energy Innovation, LLC, Golden, CO (US)

(72) Inventors: Frederick G. Baddour, Denver, CO (US); Susan E. Habas, Boulder, CO (US); Brittney E. Petel, Lakewood, CO (US); Alexander Kenneth Yung, Fort Collins, CO (US)

(73) Assignee: Alliance for Energy Innovation, LLC, Golden, CO (US)

( * ) Notice: Subject to any disclaimer, the term of this patent is extended or adjusted under 35 U.S.C. 154(b) by 434 days.

(21) Appl. No.: 18/173,317

(22) Filed: Feb. 23, 2023

(65) Prior Publication Data

US 2023/0264166 A1     Aug. 24, 2023

Related U.S. Application Data

(60) Provisional application No. 63/313,011, filed on Feb. 23, 2022.

(51) Int. Cl.
| | |
|---|---|
| *B01J 19/00* | (2006.01) |
| *B22F 1/054* | (2022.01) |
| *B22F 9/24* | (2006.01) |
| *B82Y 30/00* | (2011.01) |
| *B82Y 40/00* | (2011.01) |

(52) U.S. Cl.
CPC ......... *B01J 19/0093* (2013.01); *B22F 1/0547* (2022.01); *B22F 9/24* (2013.01); *B01J 2219/00822* (2013.01); *B01J 2219/00824* (2013.01); *B01J 2219/00831* (2013.01); *B01J 2219/00833* (2013.01); *B01J 2219/0086* (2013.01); *B01J 2219/00889* (2013.01); *B01J 2219/00894* (2013.01); *B22F 2009/245* (2013.01); *B22F 2301/255* (2013.01); *B22F 2304/054* (2013.01); *B82Y 30/00* (2013.01); *B82Y 40/00* (2013.01)

(58) Field of Classification Search
CPC .................... B01J 19/0093; B01J 35/45; B01J 2019/00788; B01J 2019/00894; B22F 9/24; B01F 25/4323; B01F 25/43
See application file for complete search history.

(56) References Cited

U.S. PATENT DOCUMENTS

| | | | | | |
|---|---|---|---|---|---|
| 3,486,862 | A | * | 12/1969 | Unterstenhoefer | ... B29B 7/7419 |
| | | | | | 261/DIG. 26 |
| 2014/0094626 | A1 | | 4/2014 | Challa | |

OTHER PUBLICATIONS

Abalde-Cela et al., "Droplet microfluidics for the highlycontrolled synthesis of branchedgold nanoparticles", Scientific Reports, 2018, vol. 8, No. 2440, pp. 1-6.

(Continued)

*Primary Examiner* — Anshu Bhatia
(74) *Attorney, Agent, or Firm* — Michael A. Mcintyre

(57) ABSTRACT

The present disclosure relates to a method of synthesizing metal nanoparticles, where the method includes mixing a metal precursor with a stabilizing ligand in a first zone of a first fluidic device to form a first mixture and mixing the first mixture with a reductant in a second zone of the first fluidic device to form a second mixture, such that the metal nanoparticles form in the second zone.

21 Claims, 28 Drawing Sheets

(56) References Cited

OTHER PUBLICATIONS

Abou-Hassan et al., "Multistep Continuous-Flow Microsynthesis of Magnetic and Fluorescent γ-Fe2O3@SiO2 Core/Shell Nanoparticles", Angewandte Chemie International Edition, 2009, vol. 48, No. 39, pp. 7180-7183.

Ahmed et al., "Efficient Seed-Mediated Method for the Large-Scale Synthesis of Au Nanorods", Journal of Nanoparticle Research, 2017, vol. 19, No. 115, pp. 1-9.

Alvarez-Puebla et al., "Gold nanorods 3D-Supercrystals as Surface Enhanced Raman Scattering Spectroscopy Substrates for the Rapid Detection of Scrambled Prions", Proceedings of the National Academy of Sciences, 2011, vol. 108, No. 20, pp. 8157-8161.

Au et al., "3D-Printed Microfluidics", Angewandte Chemie International Edition, 2016, vol. 55, No. 12, pp. 3862-3881.

Beauchamp et al., "Moving from Millifluidic to Truly Microfluidic Sub-100-Mm Cross-Section 3D Printed Devices", Analytical and Bioanalytical Chemistry, 2017, vol. 409, No. 18, pp. 4311-4319.

Biswas et al., "Developing a Millifluidic Platform for the Synthesis of Ultrasmall Nanoclusters: Ultrasmall Copper Nanoclusters as a Case Study", Small, 2012, vol. 8, No. 5, pp. 688-698.

Brewer et al., "Probing BSA Binding to Citrate-Coated Gold Nanoparticles and Surfaces", Langmuir, 2005, vol. 21, No. 20, pp. 9303-9307.

Cattaneo et al., "Synthesis of Highly Uniform and Composition-Controlled Gold-Palladium Supported Nanoparticles in Continuous Flow", Nanoscale, 2019, vol. 11, No. 17, pp. 8247-8259.

Cavigli et al., "Photostability of Contrast Agents for Photoacoustics: The Case of Gold Nanorods", Nanomaterials, 2021, vol. 11, pp. 1-30.

Cerdà et al., "Chips: How to Build and Implement Fluidic Devices in Flow Based Systems", Talanta 2017, vol. 166, pp. 412-419.

Damilos et al., "Continuous Citrate-capped Gold Nanoparticle Synthesis in a Two-phase Flow Reactor", Journal of Flow Chemistry, 2021, vol. 11, No. 3, pp. 553-567.

Daruich De Souza et al., "Review of the Methodologies Used in the Synthesis Gold Nanoparticles by Chemical Reduction", Journal of Alloys and Compounds, 2019, vol. 798, pp. 714-740.

Dong et al., "Synthesis of Precision Gold Nanoparticles Using Turkevich Method", Kona: powder science and technology in Japan, 2020, vol. 37, pp. 224-232.

Dragone et al., "3D-printed devices for continuous-flow organic chemistry", Beilstein Journal of Organic Chemistry, 2013, vol. 9, pp. 951-959.

Duraiswamy et al., "Droplet-Based Microfluidic Synthesis of Anisotropic Metal Nanocrystals", Small, 2009, vol. 5, No. 24, pp. 2828-2834.

Feng et al., "Microfluidics-Mediated Assembly of Functional Nanoparticles for Cancer-Related Pharmaceutical Applications", Nanoscale, 2016, vol. 8, No. 25, pp. 12430-12443.

Gole et al., "Seed-Mediated Synthesis of Gold Nanorods: Role of the Size and Nature of the Seed", Chemistry of Materials, 2004, vol. 16, No. 19, pp. 3633-3640.

Gomez et al., "Scaled-up Production of Plasmonic Nanoparticles Using Microfluidics: From Metal Precursors to Functionalized and Sterilized Nanoparticles", Lab on a Chip, 2014, vol. 14, No. 2, pp. 325-332.

Gross et al., "Recent Advances in Analytical Chemistry by 3D Printing", Analytical Chemistry, 2017, vol. 89, No. 1, pp. 57-70.

Haiss et al., "Determination of Size and Concentration of Gold Nanoparticles from UV—Vis Spectra", Analytical Chemistry, 2007, vol. 79, No. 11, pp. 4215-4221.

Hofmann et al., "A Microfluidic Device for the Investigation of RapidGold Nanoparticle Formation in Continuous Turbulent Flow", Journal of Physics: Conference Series, 2016, vol. 712, No. 012072, pp. 1-4.

Hou et al., "Automatic Generation of 3D-Printed Reactionware for Chemical Synthesis Digitization using ChemSCAD", ACS Central Science, 2021, vol. 7, pp. 212-218.

Hu et al., "Gold Nanostructures: Engineering Their Plasmonic Properties for Biomedical Applications", Chemical Society Reviews, 2006, vol. 35, No. 11, pp. 1084-1094.

Huang et al., "Continuous Flow Synthesis of Ultrasmall Gold Nanoparticles in a Microreactor Using Trisodium Citrate and Their SERS Performance", Chemical Engineering Science, 2018, vol. 189, pp. 422-430.

Huang et al., "Rapid Synthesis of [Au25(Cys)18] Nanoclusters via Carbon Monoxide in Microfluidic Liquid-Liquid Segmented Flow System and Their Antimicrobial Performance", Chemical Engineering Journal, 2020, vol. 383, No. 123176, pp. 1-7.

Ivanov et al., "Investigations of the Mechanism of Gold Nanoparticle Stability and Surface Functionalization in Capillary Electrophoresis", ACS Nano, 2009, vol. 3, No. 2, pp. 386-394.

Jana et al., "Wet Chemical Synthesis of High Aspect Ratio Cylindrical Gold Nanorods", The Journal of Physical Chemistry B, 2001, vol. 105, No. 19, pp. 4065-4067.

Jana et al., "Seeding Growth for Size Control of 5-40 Nm Diameter Gold Nanoparticles", Langmuir, 2001, vol. 17, No. 22, pp. 6782-6786.

Jeon et al., "Design and simulation of passive mixing in microfluidic systems with geometric variations", Chemical Engineering Journal, 2009, vol. 152, pp. 575-582.

Jiang et al., "Gold Nanorods: Influence of Various Parameters as Seeds, Solvent, Surfactant on Shape Control", Colloids and Surfaces A: Physicochemical and Engineering Aspects, 2007, vol. 295, pp. 228-232.

Johnson et al., "Growth and Form of Gold Nanorods Prepared by Seed-Mediated, Surfactant-Directed Synthesis", Journal of Materials Chemistry, 2002, vol. 12, No. 6, pp. 1765-1770.

Jun et al., "Understanding of the Size Control of Biocompatible GoldNanoparticles in Millifluidic Channels", Langmuir, 2012, vol. 28, pp. 15966-15974.

Kitson et al., "Configurable 3D-Printed millifluidic and microfluidic 'lab on a chip' reactionware devices", Lab on a Chip—The Royal Society of Chemistry, 2012, vol. 12, No. 18, pp. 3267-3271.

Kitson et al., "3D printing of versatile reactionware for chemical synthesis", Nature Protocols, 2016, vol. 11, No. 5, pp. 920-936.

Kozek et al., "Large-Scale Synthesis of Gold Nanorods through Continuous Secondary Growth", Chemistry of Materials, 2013, vol. 25, No. 22, pp. 4537-4544.

Krishna et al., "Millifluidics for Time-resolved Mapping of the Growth of Gold Nanostructures", Journal of the American Chemical Society, 2013, vol. 135, pp. 5450-5456.

Kumar et al., "Mixing in curved tubes", Chemical Engineering Sciences, 2006, vol. 61, pp. 5742-5753.

Li et al., "Size Evolution of Gold Nanoparticles in a MillifluidicReactor", ChemPhysChem, 2012, vol. 13, pp. 177-182.

Liao et al., "A Millisecond Passive Micromixer with Low Flow Rate, Low Sample Consumption and Easy Fabrication", Scientific Reports 2021, vol. 11, No. 20119, pp. 1-14.

Liu et al., "Mechanism of Silver(I)-Assisted Growth of Gold Nanorods and Bipyramids", The Journal of Physical Chemistry B, 2005, vol. 109, No. 47, pp. 22192-22200.

Lohse et al., "A Simple Millifluidic Benchtop Reactor System for the High-Throughput Synthesis and Functionalization of Gold Nanoparticles with Different Sizes and Shapes", ACSNano, 2013, vol. 7, No. 5, pp. 4135-4150.

Meng et al., "Preparation and Progress in Application of Gold Nanorod", Journal of Nanomaterials, 2019, vol. 2019, No. 4925702, pp. 1-11.

Navin et al., "Investigation of the Synthesis and Characterization of Platinum-DMSA Nanoparticles Using Millifluidic Chip Reactor", Chemical Engineering Journal, 2015, vol. 281, pp. 81-86.

Ni et al., "Tailoring Longitudinal Surface Plasmon Wavelengths, Scattering and Absorption Cross Sections of Gold Nanorods", ACS Nano, 2008, vol. 2, No. 4, pp. 677-686.

Nivedita et al., "Dean Flow Dynamics in Low-Aspect Ratio Spiral Microchannels", Scientific Reports, 2017, vol. 7, No. 44072, pp. 1-10.

Orendorff et al., "Quantitation of Metal Content in the Silver-Assisted Growth of Gold Nanorods", The Journal of Physical Chemistry B, 2006, vol. 110, No. 9, pp. 3990-3994.

(56)                    References Cited

OTHER PUBLICATIONS

Panariello et al., "Highly reproducible, high-yield flow synthesis of gold nanoparticles based on a rational reactor design exploiting the reduction of passivated Au(III)", Reaction Chemistry & Engineering, 2020, vol. 5, pp. 663-676.

Park et al., "Mechanism of Gold Nanorods", Chemistry of Materials, 2013, vol. 25, No. 4, pp. 555-563.

Pong et al., "New Insights on the Nanoparticle Growth Mechanism in the Citrate Reduction of Gold(III) Salt: Formation of the Au Nanowire Intermediate and Its Nonlinear Optical Properties", The Journal of Physical Chemistry C, Apr. 2007, vol. 111, No. 17, pp. 6281-6287.

Prabhakar et al., "A simple cost-effective microfluidic platform for rapid synthesis of diverse metal nanoparticles: A novel approach towards fighting SARSCoV-2", Materials Today: Proceedings, 2023, vol. 80, pp. 1852-1857.

Rahman et al., "Microreactors for Gold Nanoparticles Synthesis:From Faraday to Flow", Processes, 2014, vol. 2, pp. 466-493.

Roberts et al., "Continuous Flow Methods of Fabricating Catalytically Active Metal Nanoparticles", ACS Applied Materials & Interfaces, 2019, vol. 11, No. 31, pp. 27479-27502.

Sau et al., "Seeded High Yield Synthesis of Short Au Nanorods in Aqueous Solution", Langmuir, 2004, vol. 20, No. 15, pp. 6414-6420.

Scarabelli et al., "A 'Tips and Tricks' Practical Guide to the Synthesis of Gold Nanorods", The Journal of Physical Chemistry Letters, 2015, vol. 6, No. 21, pp. 4270-4279.

Schönfeld et al., "Simulation of Helical Flows in Microchannels", American Institute of Chemical Engineers, Apr. 2004, vol. 50, No. 4, pp. 771-778.

Song et al., "Microfluidic Synthesis of Nanomaterials", Small, 2008, vol. 4, No. 6, pp. 698-711.

Uson et al., "Continuous Microfluidic Synthesis and Functionalization of Gold Nanorods", Chemical Engineering Journal, 2016, vol. 285, pp. 286-292.

Vashisth et al., "A Review on the Potential Applications of Curved Geometries in Process Industry", Industrial & Engineering Chemistry Research, 2008, vol. 47, No. 10, pp. 3291-3337.

Wagner et al., "Generation of Metal Nanoparticles in a Microchannel Reactor", Chemical Engineering Journal, 2004, vol. 101, Nos. 1-3, pp. 251-260.

Waheed et al., "3D Printed Microfluidic Devices: Enablers and Barriers", Lab on a Chip, May 2016, vol. 16, No. 11, pp. 1993-2013.

Wang et al., "Plasmonic Photocatalysis for Organic Synthesis and Clean Energy Conversion", Chemical Society Reviews, 2014, vol. 43, No. 20, pp. 7188-7216.

Watt et al., "Effect of Seed Age on Gold Nanorod Formation: A Microfluidic, Real-Time Investigation", Chemistry of Materials, 2015, vol. 27, pp. 6442-6449.

Wei et al., "Seed-Mediated Synthesis of Gold Nanorods at Low Concentrations of CTAB", ACS Omega, 2021, vol. 6, No. 13, pp. 9188-9195.

Wuithschick et al., "Turkevich in New Robes: Key Questions Answered for the Most Common Gold Nanoparticle Synthesis", ACS Nano, 2015, vol. 9, No. 7, pp. 7052-7071.

Xu et al., "Large-Scale, Low-Cost Synthesis of Monodispersed Gold Nanorods Using a Gemini Surfactant", Nanoscale, 2015, vol. 7, No. 15, pp. 6790-6797.

Yagyu et al., "Continuous flow synthesis of monodisperse gold nanoparticles by liquid-phasereduction method on glass microfluidic device", Micro & Nano Letters, 2017, vol. 12, No. 8, pp. 536-539.

* cited by examiner

3D-3
*8-curve + 90° bends*

3D-2
*8-curve + contractions*

3D-1
*parent 8-curve*

*Increasingly chaotic fluid flow*

A)

4.6 ± 1.1 nm

B)

A)

4.5 ± 1.0 nm

B)

A)

5.2 ± 1.5 nm

B)

length: 14.2 ± 5.5 nm
width: 5.4 ± 0.9 nm
AR: 2.6 ± 0.7

Au NPs: 5.6 ± 1.9 nm
NR: 64%, spheres: 36%

Au NRs length: 21.5 ± 6.3 nm
width: 9.5 ± 2.7 nm
AR: 2.3 ± 0.5

Au NPs: 9.4 ± 6.6 nm
NR: 52%, spheres: 48%

Au NRs length: 14.2 ± 3.6 nm
width: 5.7 ± 1.0 nm
AR: 2.5 ± 0.5

Au NPs: 5.7 ± 2.6 nm
NR: 68%, spheres: 32%

FLUIDIC SYSTEMS AND METHODS FOR THE MANUFACTURE OF NANOPARTICLES

CROSS-REFERENCE TO RELATED APPLICATIONS

This application claims priority from U.S. Provisional Patent Application No. 63/313,011 filed on Feb. 23, 2022, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Metal nanoparticles (NPs) have a variety of industrial applications including their use as catalysts in electrochemical reactions, for example the electrochemical reduction of $CO_2$ ($ECO_2R$) to a variety of products including CO, HCOOH, $C_xH_yOH$, $CH_4$, and $C_xH_y$. Transition metal NPs in particular may catalyze a number of chemical reactions due to the tunability of their physical properties, including, among other things, the size and shape of the NPs. Current methods and systems for synthesizing metal NPs, such as batch syntheses in stirred tank reactors, are fraught with challenges including scale-up difficulties and batch-to-batch variability (i.e., difficulties in controlling the reaction to obtain repeatable results), ultimately leading to the inability to produce catalyst NPs that would meet manufacturing-scale quality control requirements. Therefore, there remains a need for improved methods and systems for producing better quality metal NPs consistently and reliably.

SUMMARY

An aspect of the present disclosure is a device that includes a channel constructed of at least two runs fluidly connected in series by a bend, a first inlet fluidly connected to a first end of the channel, an outlet fluidly connected to a second end of the channel, a second inlet fluidly connected to the channel between the first inlet and the outlet, and a third inlet fluidly connected to the channel between the second inlet and the outlet, where the channel has a diameter between 0.1 mm and 10 mm. In some embodiments of the present disclosure, each run may be positioned substantially parallel to adjacent runs.

In some embodiments of the present disclosure, the bend may redirect the channel by approximately 180 degrees. In some embodiments of the present disclosure, the number of runs making up the channel may be between 2 and 100 runs. In some embodiments of the present disclosure, the device may further include a mixing element positioned in at least one of the runs. In some embodiments of the present disclosure, at least one run of the channel may have between 2 and 100 mixing elements. In some embodiments of the present disclosure, a mixing element may include a bend in the run. In some embodiments of the present disclosure, the bend of a mixing element positioned in the run of a channel may redirect the run by about 90 degrees.

In some embodiments of the present disclosure, the mixing element may include a narrowing in the diameter of the channel, followed by a widening in the diameter of the channel. In some embodiments of the present disclosure, the channel may be positioned within a block of material, where the material includes at least one of a plastic, a ceramic, a glass, and/or a metal. In some embodiments of the present disclosure, the material may be capable of operating at a temperature between 0° C. and 200° C. In some embodiments of the present disclosure, the material may be capable of operating at a pressure between one atmosphere and ten atmospheres of absolute pressure. In some embodiments of the present disclosure, the channel may have a volume between 100 ml and 10,000 ml. In some embodiments of the present disclosure, the channel may have a total length between 10 mm and 10,000 mm. In some embodiments of the present disclosure, the channel may be characterized by laminar flow, with water flowing through the channel at a flow rate between 1 ml/min and 100 ml/min.

An aspect of the present disclosure is a system that includes a first fluidic device and a second fluidic device, where the first fluidic device and the second device are connected in series by a union.

An aspect of the present disclosure is a method of synthesizing metal nanoparticles, where the method includes mixing a metal precursor with a stabilizing ligand in a first zone of a first fluidic device to form a first mixture and mixing the first mixture with a reductant in a second zone of the first fluidic device to form a second mixture, such that metal nanoparticles form in the second zone. In some embodiments of the present disclosure, the metal nanoparticles may have a substantially spherical shape with an average diameter between about 1 nm and about 10 nm. In some embodiments of the present disclosure, the method may further include directing the second mixture from the first fluidic device to a second fluidic device, mixing in a first zone of the second fluidic device the second mixture with a diluting liquid to form a third mixture, and mixing in a second zone of the second fluidic device the third mixture with liquid that includes the metal precursor, such that at least a portion of the spherical metal nanoparticles are transformed into nanorods.

REFERENCE NUMERALS

Figure 1:
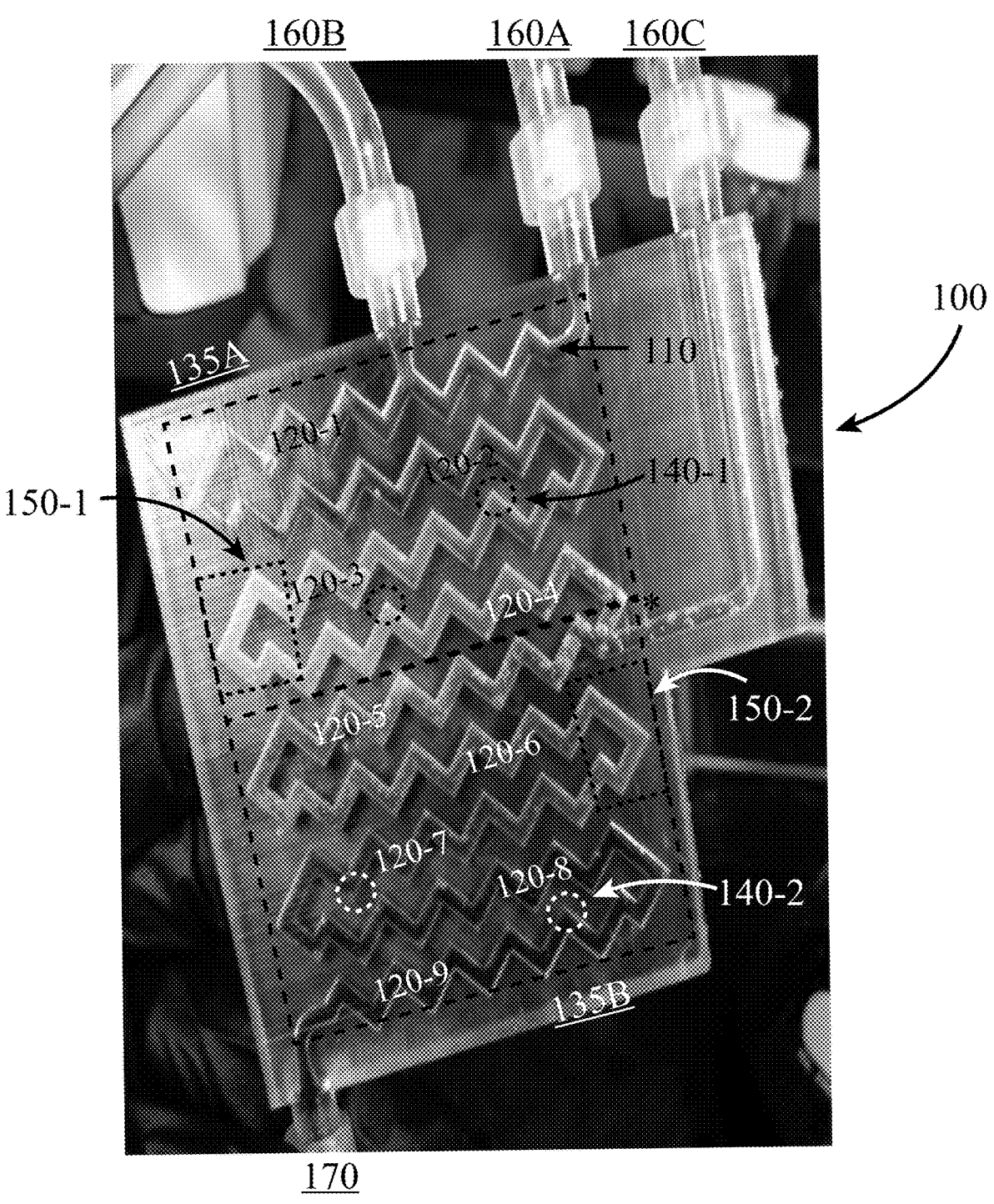
FIG. 1 illustrates a 3D-printed flow reactor, i.e., fluidic device, according to some embodiments of the present disclosure. Gold nanoparticle formation was observed only after addition of the reductant at the third inlet as seen by the higher contrast of the section following the third inlet (reference numeral 160C).

100 . . . fluidic device
110 . . . channel
120 . . . run
135A . . . first zone
135B . . . second zone
135C . . . third zone
140 . . . mixing element
150 . . . connector/bend
160A . . . first inlet
160B . . . second inlet
160C . . . third inlet
170 . . . outlet
400 . . . system
410 . . . first component
420 . . . second component
430 . . . first mixture
440 . . . third component
450 . . . first product mixture
460 . . . fourth component
470 . . . second product mixture
500 . . . union
700 . . . method
710 . . . first mixing
720 . . . second mixing
730 . . . third mixing

DETAILED DESCRIPTION

The present disclosure relates to devices, systems, and methods for synthesizing metal nanoparticles (NPs) including unsupported metal NPs and supported metal NPs, and NPs having both spherical and rodlike shapes. An exemplary use of such materials is as catalysts for a variety of industrially meaningful chemical reactions. In some embodiments of the present disclosure, the devices, systems, and/or methods described herein may implement a continuous flow design, which, among other things, may enable scaling up the manufacture of these materials to larger quantities and/or production rates. As described herein, to validate the usefulness and notable advantages of such devices and systems, both unsupported gold NPs and gold NPs positioned on a carbon support (NP—Au/C) were synthesized, with NPs having both a substantially spherical shape and a rodlike shape, using a millifluidic (mF) flow reactor (i.e., fluidic device) that enabled the controlled mixing of a gold precursor (hydrogen tetrachloroaurate(III), $HAuCl_4$), a stabilizing ligand (trisodium citrate, $Na_3Ct$), and a reductant (sodium borohydride, $NaBH_4$). In some embodiments of the present disclosure, spherical Au NPs were synthesized having particle sizes less than 10 nm that were subsequently dispersed on a conductive carbon-support. In some embodiments of the present disclosure, this was accomplished at manufacturing rates between about 100 mg Au/hr and 312 mg Au NP/hr. In some embodiments of the present disclosure, the sub-10 nm Au NPs were used as seeds for the growth of gold nanorods (NRs). Au NRs were synthesized having particle sizes with average lengths between about 12 nm and about 24 nm and widths between about 5 nm and about 10 nm, corresponding to an aspect ratio (AR) between about 2 and about 3. In some embodiments of the present disclosure, such "seeding" experiments results in a mixture of spherical NPs and NRs, with an average of 60% of the particles being Au NRs, with the remaining 40% of particles being spherical Au NPs having average diameters between about 3 nm and about 13 nm.

As used in the remainder of the description, the term "nanoparticle (NP)" will refer to a solid particle having a characteristic length dimension between 0.1 nm and 100 nm. Further, a NP may have a variety of characteristic shapes, including spherical, oval, cylindrical, rodlike, etc. For a spherical NP, the characteristic length may be the particles diameter. For a rodlike NP, a particle may have two characteristic lengths, one for the rodlike NP's width and a second for its length. In addition, for the remainder of the description NPs having a rodlike shape will be referred to as "nanorods", abbreviated NR. "Nanoparticles", abbreviated NPs, refers to nanoparticles having any characteristic shape, including rodlike nanoparticles.

FIG. 1 illustrates a design of an exemplary fluidic device 100 that was manufactured by stereolithographic (SLA) 3D-printing. This design includes three inlets, a first inlet 160A, a second inlet 160B, and a third inlet 160C, configured to receive a gold precursor, a stabilizing ligand, and a reductant, respectively. The fluidic device 100 was designed to mix these three components as they flow through a single channel 110 constructed of several sections, i.e., runs 120, where each run is positioned substantially parallel to adjacent runs and fluidly joined in series by a connector, i.e., bend 150. During mixing, metal NPs are formed, for example spherical NPs, and the resultant product, e.g., a solution containing metal NPs, subsequently exits the fluidic device 100 at an outlet 170.

Referring again to FIG. 1, the exemplary fluidic device 100, includes a channel 110 having a total length of about 73 cm, constructed of nine individual interconnected runs (120-1 through 120-9) positioned substantially parallel to one another. In this design, each run 120 is configured to include multiple mixing elements 140, where each mixing element includes a 90-degree bend. Two mixing elements are labeled in FIGS. 1, 140-1 and 140-2, with four mixing elements indicated by dashed circles. In this design of a fluidic device 100, each run 120 includes eleven or twelve mixing elements 140, with an additional mixing element 140 positioned in each bend 150 connecting adjacent runs 120. The exemplary fluidic device 100 includes a total of eight bends 140 connecting the nine runs (120-1 through 120-9) in series. Two of the eight bends 150 are called out with dashed boxes and are numbered 150-1 and 150-2.

Referring again to FIG. 1, the exemplary fluidic device 100 can be viewed as having two zones for mixing the three components, a first zone 135A for pre-mixing two of the three components, and a second zone 135B, for adding and mixing the third component to the pre-mixed first and second components. In this example, the gold precursor (i.e., first component) is directed to the fluidic device 100 via the first inlet 160A and the stabilizing ligand (i.e., second component) via the second inlet 160B, after which these two components are "pre-mixed" in the first zone 135A. The first zone 135A is encompassed by a dashed box and includes four parallel runs, 120-1 through 120-4, four bends 150, and a total of 51 mixing elements 140. The premixing of the gold precursor and stabilizing ligand insures that the two components are thoroughly mixed before the addition of the reductant (i.e., third component, via the third inlet, 160C).

The second zone 135B of the fluidic device 100 begins where the reductant (i.e., third component) first contacts the stabilized mixture of the metal precursor and the stabilizing ligand (i.e., first and second components, respectively), which occurs at the union of the third inlet 160C with the channel 110. This union is indicated by the asterisk (*). The second zone 135B is also encompassed by a dashed box and includes five parallel runs, 120-5 through 120-9, four bends 150, and a total of 64 mixing elements 140. The second zone 135B provides mixing of all three components, the premixed metal precursor and stabilizing ligand, with the reductant, and the resultant mixture (i.e., metal NP-containing product) exits the fluidic device 100 at the outlet 170. Referring again to FIG. 1, the first zone 135A of the fluid device 100 can be easily identified by the clear, lightly colored appearance of the liquid contained therein, whereas once the reductant is added (via the third inlet 160C) and the reaction begins, the solution in the channel gradually darkens and transitions from pink to dark purple as it passes through the second zone 135B, easily identified by the darkened appearance of the liquid contained therein (i.e., in parallel runs 120-8 and 120-9).

The fluidic device 100 illustrated in FIG. 1 is an example and is not intended to be limiting. As will be described in more detail below, other designs for fluidic devices were tested in the studies described herein and other variations on what is illustrated in FIG. 1 are considered within the scope of the present disclosure. For example, in some embodiments of the present disclosure, a fluidic device 100 may have more than a single channel 110. Referring again to FIG. 1, the exemplary fluidic device 100, has a single channel 110, starting at the first inlet 160A, which introduces a first component, and ending at the outlet 170. Two additional components are added to the original stream introduced at the first inlet 160A, forming two unions. A first union exists where the second component is added to the channel 110 via the second inlet 160B, and a second union where the third component is added to the channel 110 via the third inlet 160C (indicated by the asterisk). However, fluidic devices 110 resulting from combinations of multiple channels 110 for mixing and/or reacting multiple components via multiple inlets 160 and even multiple outlets 170 can also be envisioned.

For example, a fluidic device 100 may include two channels (or more), each starting like the channel 110 illustrated in FIG. 1, with a first inlet 160A, and a second downstream inlet 160B, thereby mixing two components to form an intermediate material. The two resultant intermediate materials may then be combined at a union formed by the joining of the two channels into a single channel that terminates with an outlet exiting the fluidic device. In some embodiments of the present disclosure, each material resulting from the flow of components through the two starting channels may be a reactant, which when mixed react to form a final target product. This sort of arrangement may, for example, enable the synthesis of NP metal alloys and/or the formation of mixed metal nanoparticles.

Referring again to FIG. 1, in some embodiments of the present disclosure, a fluidic device 100 may be constructed to have a channel 110 having between one (1) and one hundred (100) runs 120, or between one (1) and ten (10) runs 120. In some embodiments of the present disclosure, a fluidic device 100 may be constructed such that the runs 120 making up a channel 110 are interconnected by connectors and/or bends 150 that redirect the direction of the channel 110 by approximately 180 degrees, as illustrated in FIG. 1, resulting in adjacent runs 120 positioned substantially parallel to one another. In some embodiments of the present disclosure, a bend 150 may redirect the direction of a channel 110 between greater than zero degrees and 180 degrees, or between 45 degrees and 180 degrees, or between 90 and 180 degrees. In some embodiments of the present disclosure, a fluidic device 100 may be configured such that one or more runs 120 of one or more channels 110 is constructed to include one or more mixing elements 140. In some embodiments of the present disclosure, the channel 110 of a fluidic device may include between ten (10) and one thousand (1,000) mixing elements 140, or between five (5) and one hundred (100) mixing elements 140. In some embodiments of the present disclosure, a run 120 may include between two (2) and one hundred (100) mixing elements 140, or between two (2) and twenty (20) mixing elements 140.

Figure 2A:
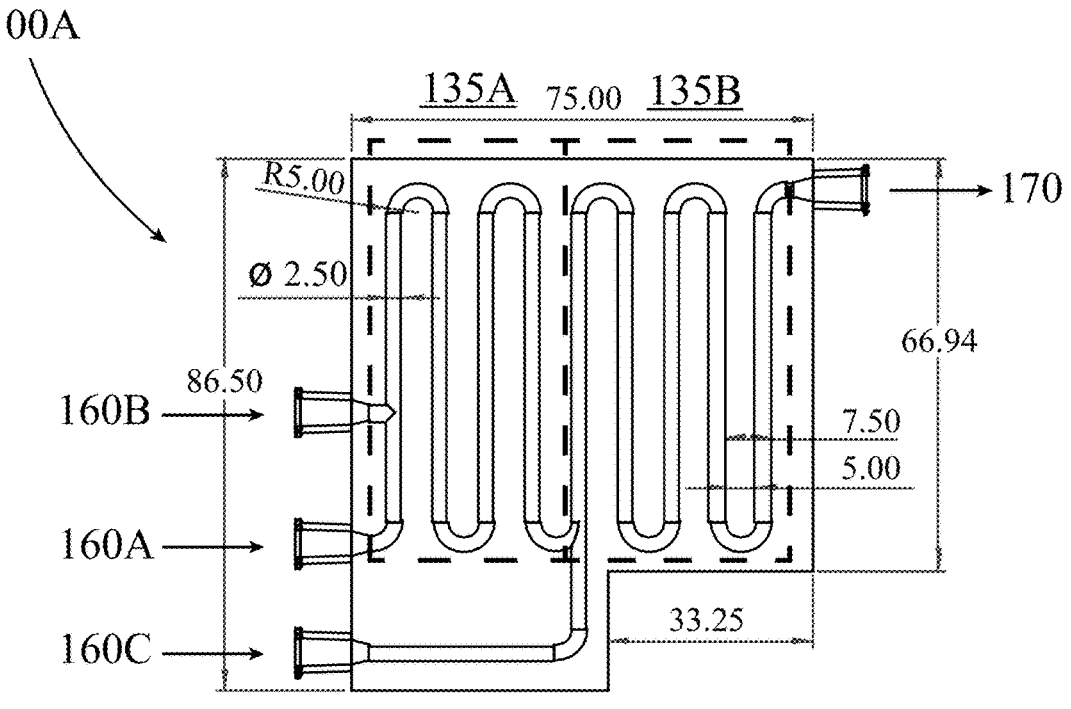
FIGS. 2A, 2B, and 2C illustrate fluidic devices, corresponding to designs 3D-1, 3D-2, and 3D-3, respectively, as shown in FIG. 3, according to some embodiments of the present disclosure. Dimensions in millimeters.
Figure 2A:
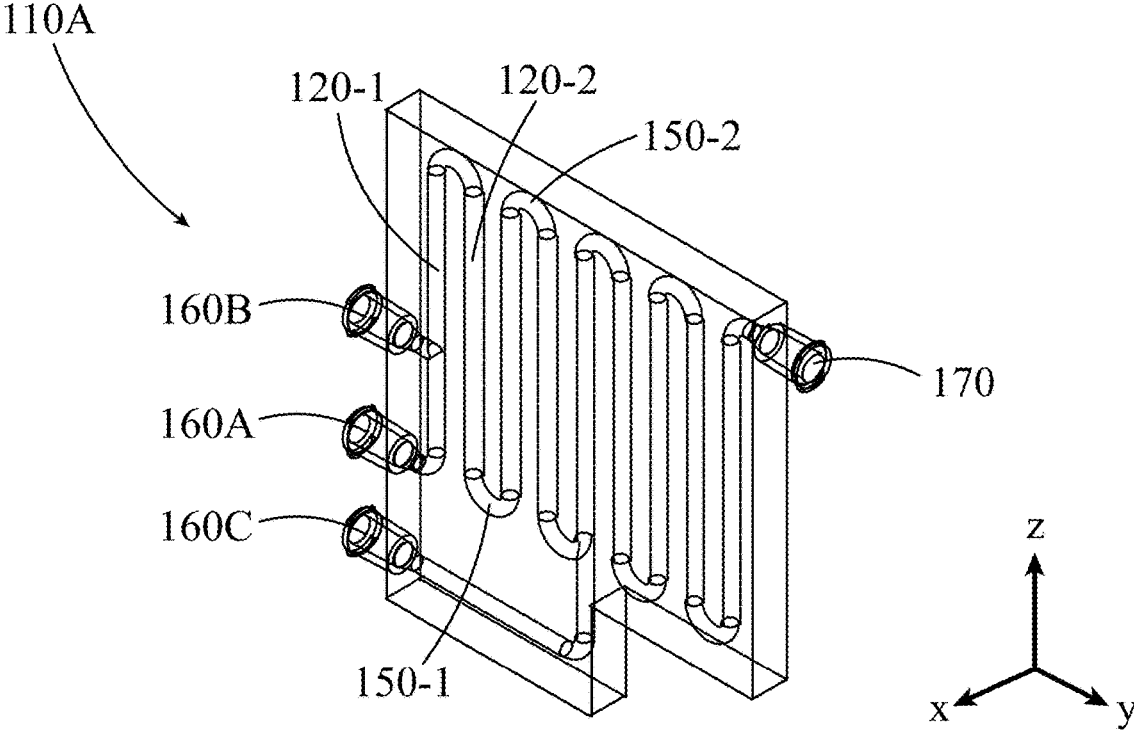
Figure 2B:
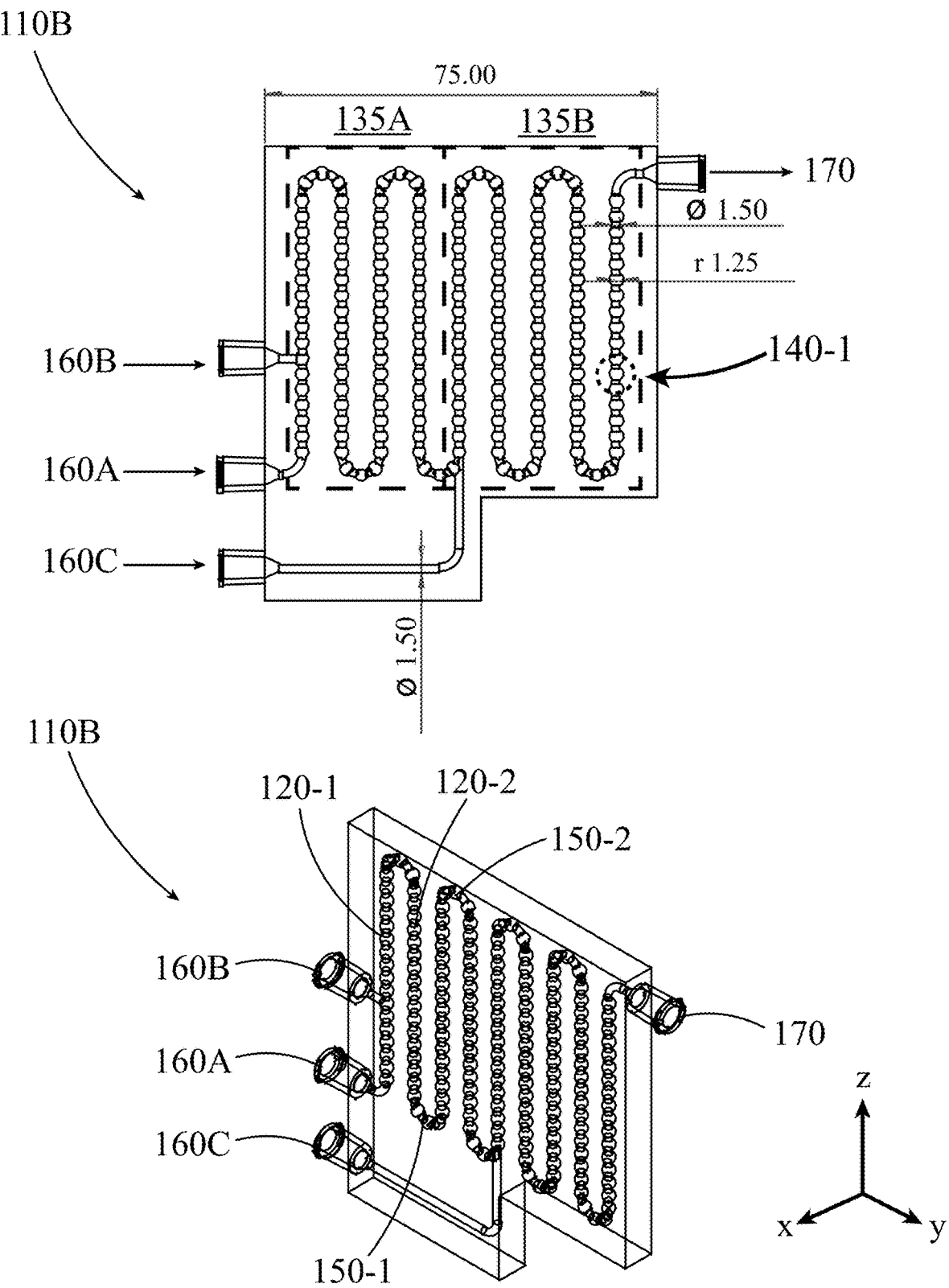
Figure 2C:
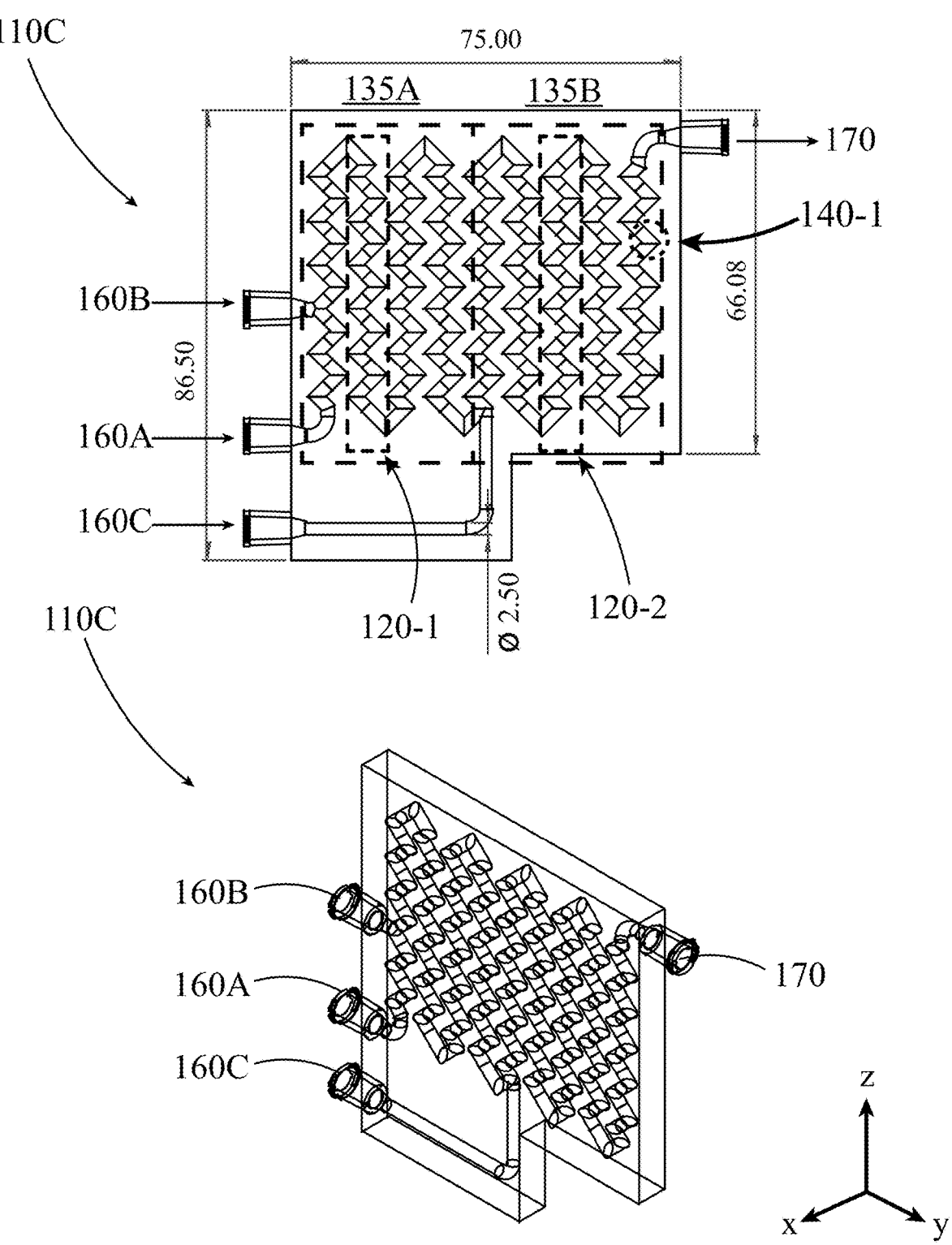
Figure 3:
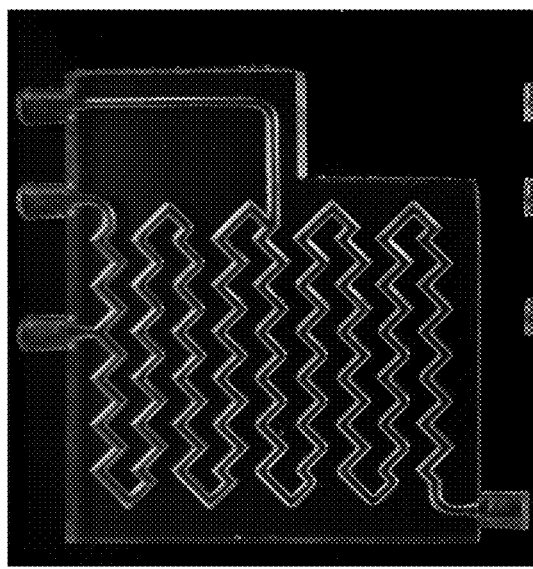
FIG. 3 illustrates 3D-printed fluidic devices for the continuous synthesis of metal nanoparticles, e.g., Au, according to some embodiments of the present disclosure.
Figure 3:
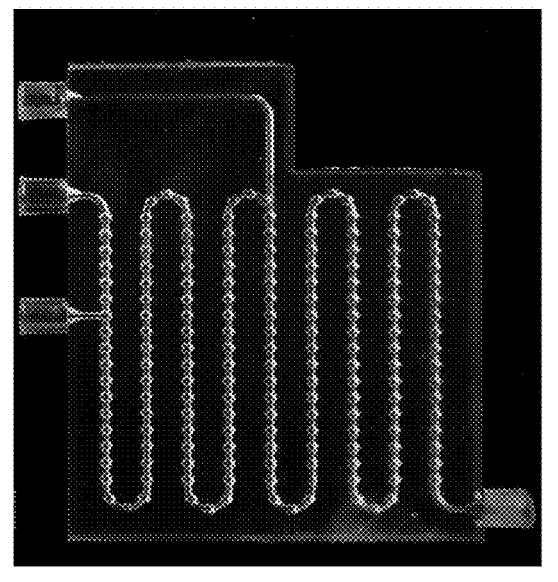
Figure 3:
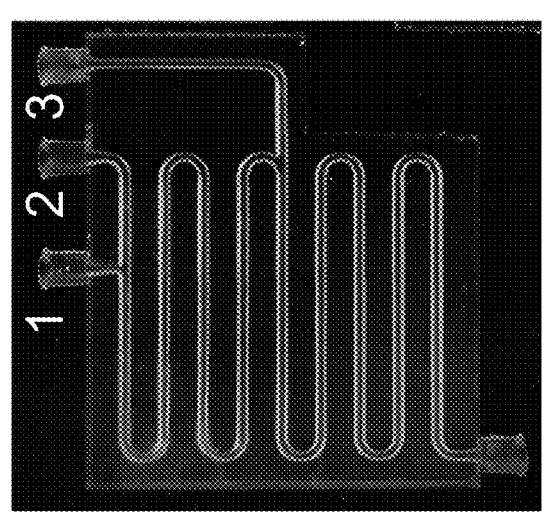

As described in detail below, a fluidic device 100, a microfluidic device and/or a millifluidic, may be characterized by the dimensions of the fluidic device. As defined herein, a microfluidic (µF) device includes channels and/or runs having primarily micrometer sized dimensions (e.g., greater than 1 micron but less than 1 millimeter). As defined herein, a millifluidic (mF) device includes channels and/or runs having primarily millimeter sized dimensions (e.g., greater than or equal to 1 millimeter, or between greater than 100 µm and about 1 to 3 mm). FIGS. 2A, 2B, and 2C illustrate examples of fluidic devices 100, according to some embodiments of the present disclosure. FIG. 2C corresponds to the experimental fluidic device illustrated in FIG. 1. These examples are each mF devices, although in some embodiments of the present disclosure, µF devices may be designed to have essentially the same general features, just at a smaller scale. Channel dimensions (e.g., length, internal volume, inner diameter) of the fluidic devices illustrated in FIGS. 2A, 2B, and 2C are listed in Table 1. Photographs of the actual designs tested in the laboratory and used to generate the experimental results reported herein are illustrated in FIG. 3.

TABLE 1

| Channel dimensions of fluidic device examples in FIGS 2A, 2B, and 2C | | | | |
|---|---|---|---|---|
| Device Description | FIG. | Total Channel Length (mm) | Internal Volume (mm³) | Inner Channel Diameter (mm) |
| Serpentine (3D-1) | FIG. 2A | 612.5 | 3006.5 | 2.5 |
| Serpentine with variable diameter nodes (3D-2) | FIG. 2B | 612.5 | 1535.4 | 2.5, 1.5 |

TABLE 1-continued

| Channel dimensions of fluidic device examples in FIGS 2A, 2B, and 2C | | | | |
|---|---|---|---|---|
| Device Description | FIG. | Total Channel Length (mm) | Internal Volume (mm³) | Inner Channel Diameter (mm) |
| Serpentine with right-angle bends (3D-3) | FIG. 2C | 728.8 | 3577.6 | 2.5 |

A fluidic device 100 may also be characterized by the fluid flow(s) passing through them. For example, for the exemplary fluidic devices 100A, 100B, and 110C (corresponding to FIGS. 2A, 2B, and 2C, respectively), as described herein, each was evaluated for the synthesis of gold NPs. For gold NPs (e.g., substantially spherical NPs) synthesis, the flow rates of the first component and the second component (e.g., metal precursor and stabilizing ligand, respectively), were typically set to equal flow rates in a range between about 3 mL min$^{-1}$ and about 12 mL min$^{-1}$ (for a total combined flow rate between 6 and 24 mL min$^{-1}$). The first mixture, corresponding to the combined fluid flow resulting from the fluids entering the first inlet 160A and 160B and flowing through the first zone 135A, had fluid velocities in a range between about 0.02 m s$^{-1}$ and about 0.09 m s$^{-1}$ and Reynolds numbers in a range between about 50 and about 203. The flow rate range for the third component (e.g., reductant), entering the fluidic device via the third inlet 160C was in a range between about 1 mL min$^{-1}$ and about 4 mL min$^{-1}$. These conditions resulted in a second combined mixture, flowing through the second zone 135B resulting from the sum of each of the three components, having fluid velocities in the second zone 135B in a range between about 0.003 m s$^{-1}$ and about 0.01 ms$^{-1}$ and Reynolds number in a range between about 8 and about 34. Therefore, fluid flow (e.g., liquid flow) within the fluidic devices tested were maintained in the laminar flow regime (e.g., Re<3,500). Note that these Re number values are calculated simply based on a straight run of a channel and does not account for mixing elements or bends. As shown below, computational fluid dynamic (CFD) modeling validates laminar flow in straight channels, but also predicts significant mixing occurs due to the mixing elements and bends connecting the runs of a channel. Further, the CFD results are validated by the experimental results, in that good quality metal nanoparticles are attained, even at short residence times within the fluidic devices, and even for the simplest 3D-1 design, that has no mixing elements, and only has bends between runs to provide mixing.

The flow rates, fluid velocities, and Reynold's number that characterized the fluids flowing through the fluidic devices used for synthesizing Au NPs are not intended to be limiting. The design of a fluidic device, characteristic diameters, mixing elements used, etc., the flow rates of precursors, additives, and/or catalysts, etc., and the resultant fluid flow characteristics through the fluidic device will vary depending on the chemistry utilized and/or physical properties of the fluids being mixed. Thus, in some embodiments of the present disclosure the fluid flow rate through a channel of a milli-fluidic device may be between about 1 mL min$^{-1}$ and about 100 mL min$^{-1}$ or between about 2.5 mL min$^{-1}$ and about 27 mL min$^{-1}$. In some embodiments of the present disclosure, the fluid flow through a channel of a milli-fluidic device may have an average fluid velocity between about $0.003$ m s$^{-1}$ and about $0.3$ m s$^{-1}$ or between about $0.008$ m s$^{-1}$ and about $0.09$ m s$^{-1}$. In some embodiments of the present disclosure, the fluid flow through a channel of a milli-fluidic device may be characterized by a Reynold's number between about 8 and about 845 or about 21 and about 233.

The fluidic devices 100 described herein were designed such that the mixing elements and zones (e.g., first zone 135A and second zone 135B) had compact geometries capable of fast manufacturing (i.e., printing times), while also maintaining a suitable overall mixing efficiency. The initial prototype for a fluidic device 100A, illustrated in FIG. 2A (referred to herein as the 3D-1 design), features a channel constructed of nine parallel runs (only two called out, 120-1 and 120-2 in FIG. 2A) (ID=2.5 mm) having a total combined length of about 612 mm. Adjacent parallel runs 120 are fluidly connected by a 180 degree "elbow" connectors 150 (eight shown, but only two called out, 150-1 and 150-2). The three-inlet system described above was incorporated into this first design, as well as in subsequent designs. The first two inlets 160A and 160B, attached to HAuCl$_4$ (first component, metal precursor) and Na$_3$Ct (second component, stabilizing ligand) stock solutions, respectively, were directed to a first zone 135A constructed of four parallel runs 120 having a total combined length of about 256 mm.

This multi-inlet design for the fluidic device (i.e., reactor) was chosen because preliminary experiments revealed that HAuCl$_4$ reduction occurs when stored at room temperature for even three hours while in the presence of Na$_3$Ct. As such, this internal premixing feature of the metal precursor with the stabilizing ligand allowed for an overall reduction of the footprint/size of the fluidic device by eliminating requirements for an additional Y-mixer as well as the extra tubing used to promote HAuCl$_4$/Na$_3$Ct premixing within preliminary reactor designs. A third inlet 160C, located downstream from the initial two inlets (160A and 160), was included for the addition of NaBH$_4$ (third component, reductant), leading to the second zone 135B constructed with five fluidly connected runs 120, connected by 180 degree elbow connectors 150, having a total length of 357 mm. Male luer adapters were incorporated into each inlet 160 and the outlet 170 for the direct connection to commercially available Tygon® tubing (OD=3.1 mm) using female luer adapters. In these examples, Tygon® tubing was used to direct components to the fluidic device. In some embodiments of the present disclosure the outlet tubing used to direct Au NPs to the collection flask or dispersion vessel used was fluorinated ethylene propylene (FEP) tubing.

Referring to FIG. 2A, this fluidic device 100 design (3D-1) provided mixing by flowing the components through straight runs 120 and by redirecting flow through bends 150. This basic straight channel design is referred to herein as a "serpentine channel". In addition to mixing components via serpentine channels (i.e., interconnected parallel straight channels), the mixing provided by a fluidic device can be increased by modifying the fluid path with physical obstacles and/or through alteration of the channel geometry, which are referred to herein as mixing elements 140. Zones with more complicated inner geometries, featuring variable diameter channels (see design 3D-2 in FIG. 3 and FIG. 2B) and sharp bends (see design 3D-3 in FIG. 3 and FIG. 2C), were employed as mixing elements 140 into the original straight channels of design 3D-1 (see FIG. 3 and FIG. 2A). All three designs illustrated in FIG. 3, include a first zone 135A constructed of four parallel runs 120 to premix the gold precursor (first component), introduced to the fluidic device via a first inlet 160A, with the stabilizing ligand (second component), introduced via a second inlet 160B. Further, all three designs, introduce the reductant (third component) to the second zone 135B of the fluidic device 100 via a third inlet 160C. Each second zone 135B of each fluidic device tested was constructed of five parallel runs. Due to these design changes to the channel, total fluidic device volumes, inner diameter, and/or lengths changed as summarized above in Table 1 above.

FIGS. 2A, 2B and 2C illustrate that a fluidic device may have a three-dimensional (3D) (in the in the x-, y-, and z-axis directions) block-like form constructed of solid material, with the channel(s), unions, inlets, and outlets, etc., positioned within the block. In some embodiments of the present disclosure, a fluidic device may be constructed via a 3D-printing process, resulting in a block-like structure constructed of a commercially available polymethacrylate polymer or silica-based polymer. In some embodiments of the present disclosure, a fluidic device may be manufactured by other subtractive processes (i.e., top-down) including milling, laser ablating, or etching. In some embodiments of the present disclosure, a fluidic device may be substantially transparent in the visible spectrum of light and/or any other suitable spectrum of light. In some embodiments of the present disclosure, a fluidic device may be substantially opaque in the visible spectrum of light and/or any other suitable spectrum of light. For the exemplary fluidic devices described herein, the x-axes (width) were maintained at 5.3 mm. The y-axes (length) had a range between about 42 mm and about 75 mm and the z-axes (height) had a range between about 66 mm to about 87 mm. Of course, other dimensions fall within the scope of the present disclosure, as determined by a particular chemistry, fluid properties, etc.

Referring again to FIG. 1, the fluidic device 100 illustrated shows that, in some embodiments of the present disclosure, a fluidic device 100 may be configured to include a first zone 135A and a second zone 135B. As previously described, for the specific example of synthesizing Au NPs, the first zone 135A may be utilized to combine and mix a gold precursor with a stabilizing ligand to generate a first mixture, whereas the second zone 135B may be utilized to add a reductant to the first mixture to initiate the desired reaction, resulting in the formation of the Au NPs. As described above, the Au NPs may then be directed to a downstream unit operation, wherein at least a portion of the Au NPs are deposited onto a solid support, e.g., a carbonaceous solid. In some embodiments of the present disclosure, the downstream unit operation for the depositing of the metal NPs onto a solid support may be performed in at least one of a third zone positioned within the fluidic device, a second fluidic device connected in series to the first fluidic device, and/or in a more "conventional" unit operation, e.g., a continuous stirred tank reactor, connected in series to the fluidic device. These concepts are illustrated in FIG. 4.

Figure 4:
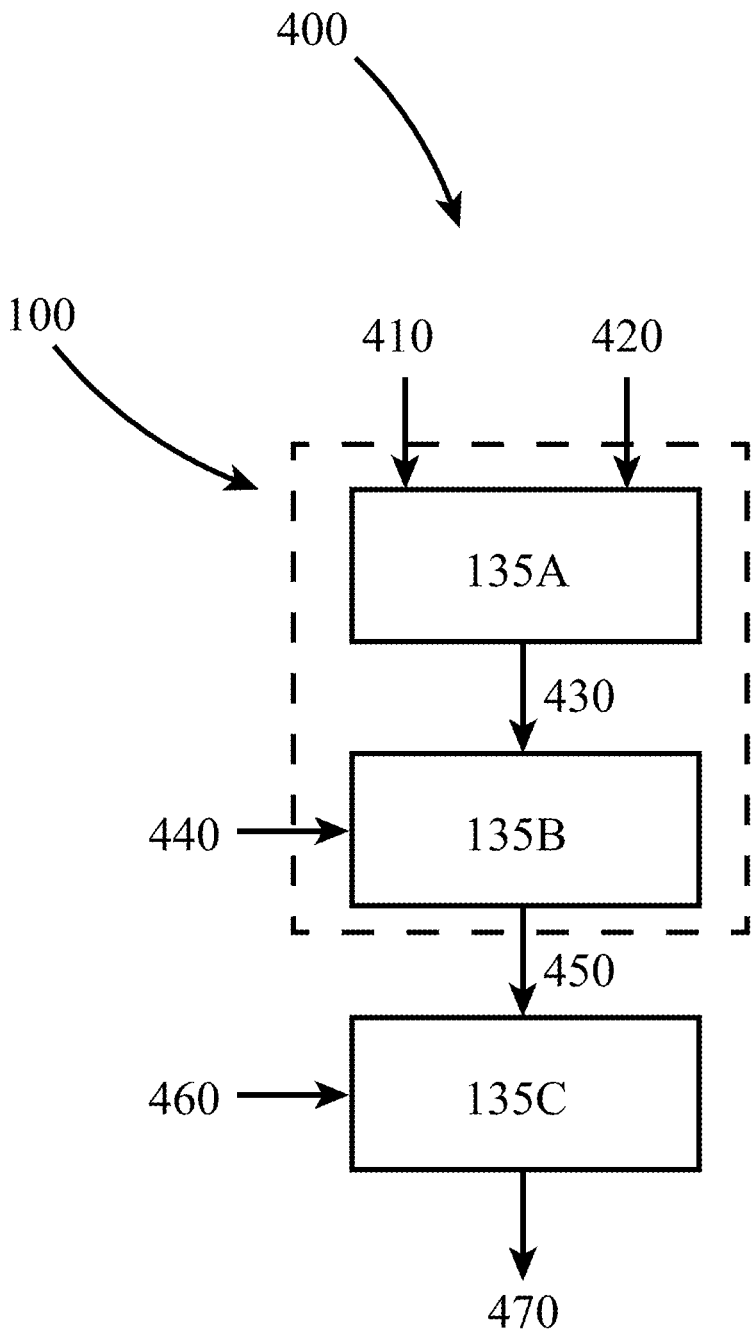
FIG. 4 illustrates a system for synthesizing metal NPs, according to some embodiments of the present disclosure.

FIG. 4 illustrates a system 400 that includes a fluidic device 100 having a first zone 135A and a second zone 135B (as shown in FIG. 1). In some embodiments of the present disclosure, a fluidic device 100 may be connected in series to a down-stream third zone 135C. FIG. 4 illustrates the third zone 135C as being separate from the fluidic device 100, according to some embodiments of the present disclosure. For example, the third zone 135C may be included in a second fluidic device and/or in a more conventional mixing unit operation, connected in series to the first fluidic device 100. Referring again to FIG. 4, a first component 410 (e.g., gold precursor) and a second component 420 (e.g., stabilizing ligand) may be directed to the first zone 135A of the fluidic device, where they are combined to form a first mixture 430. The first mixture 430 may then be combined with a third component (e.g., reductant) in the second zone 135C of the fluidic device 100, thereby forming a first product mixture 450 (e.g., Au NPs). The first product mixture 450 may then be directed to the third zone 135C where it is combined with a fourth component 460 (e.g., solid support), resulting in the formation of a second product mixture 470 (e.g., (NP—Au/C).

Figure 5A:
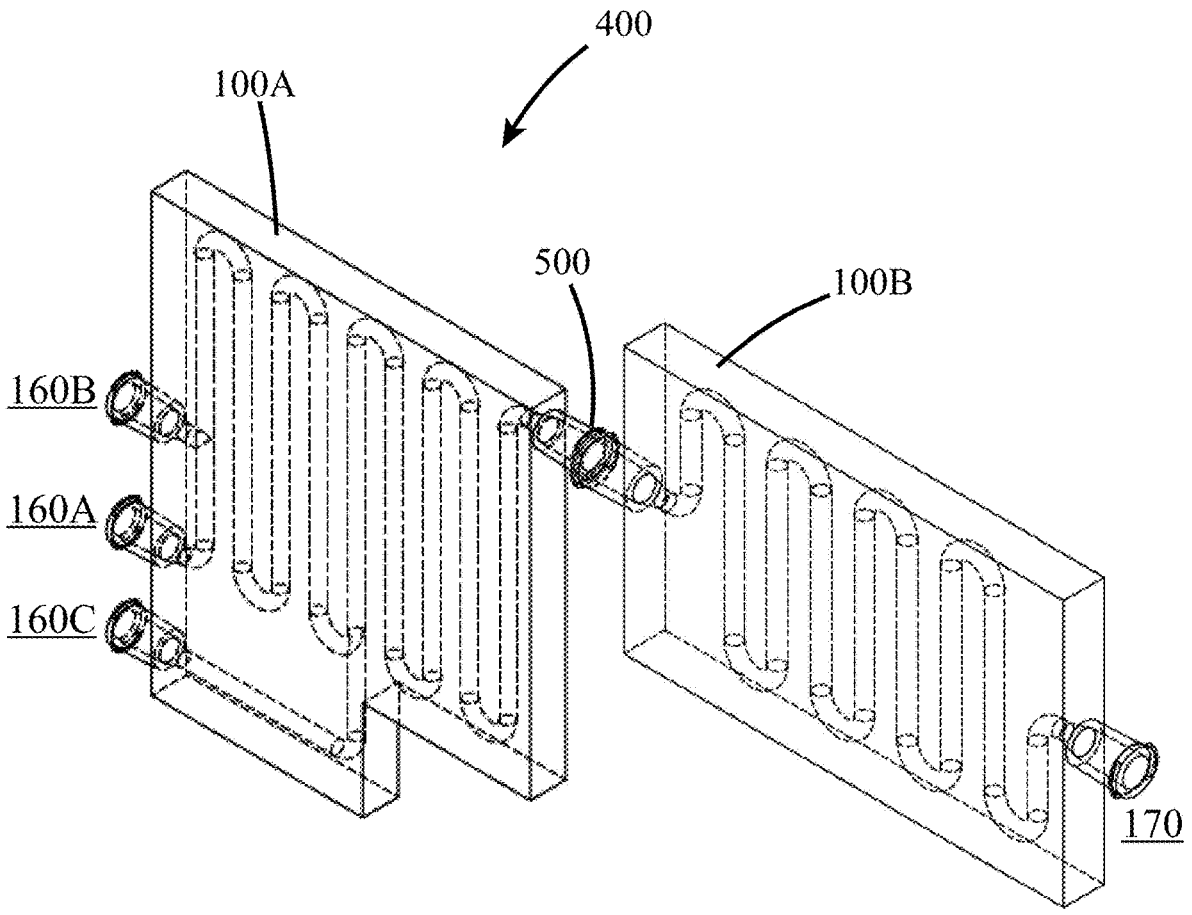
FIGS. 5A and 5B illustrate examples of systems constructed of one or more fluidic devices, according to some embodiments of the present disclosure.
Figure 5B:
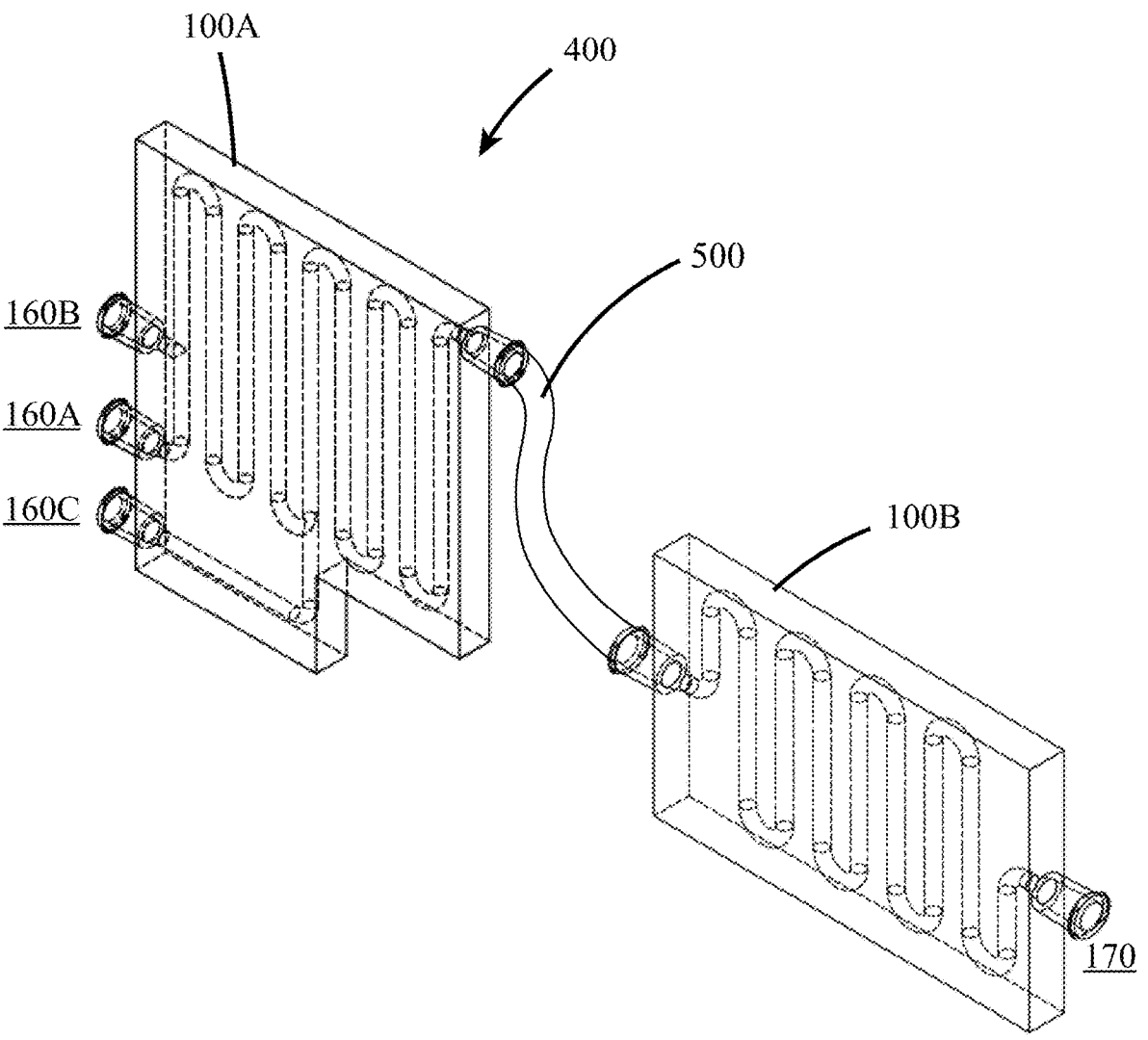

Referring again to FIG. 4, in some embodiments of the present disclosure, a third zone 135C may be included in a second fluidic device. In other words, a system 400 may include one or more interconnected fluidic devices. In some embodiments of the present disclosure, two or more fluidic devices may be connected in series as illustrated in FIGS. 5A and 5B. Referring to FIG. 5A, the exemplary system 400 includes a first fluidic device 100A connected in series to a second fluidic device 100B by a union 500. In this exemplary system 400, both fluidic devices 100A and 100B are constructed using designs similar to that shown in FIG. 2A. Referring to FIG. 5B, the first fluidic device 100A is connected in series to a second fluidic device 100B by a union 500 constructed of tubing. Among other things, such a union 500 may provide additional residence time before the mixture is directed to the downstream second fluidic device 100B. Each fluidic device 100 illustrated in FIGS. 5A and 5B may include one or more channels 110, one or more inlets 160, and/or one or more outlets 170.

Figure 5C:
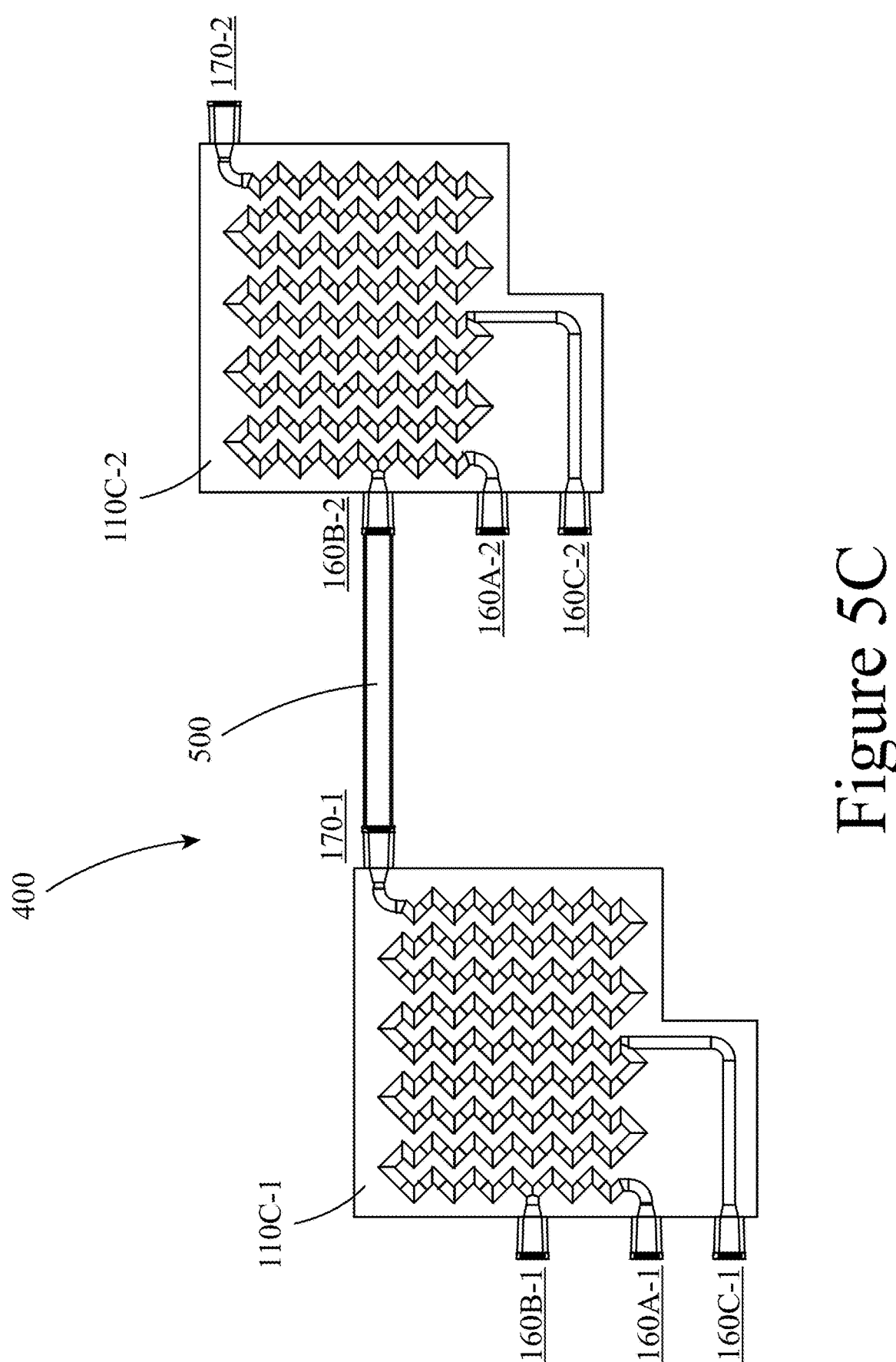
FIG. 5C illustrates an example of a system designed for the production of, among other things, rod-shaped nanoparticles (NRs), according to some embodiments of the present disclosure.

FIG. 5C illustrates a system 400 that utilizes two interconnected fluidic devices of the same design as illustrated in FIG. 2C, 100C-1 and 100C-2 which, as shown herein, can be operated to produce nanorods (NRs), e.g., rod-shaped nanoparticles. For example, the system 400 illustrated in FIG. 5C may be configured such that the first fluidic device 110C-1 produces NPs, much in the same way as described above. However, in addition, the NPs produced in the first fluidic device 110C-1 may be subsequently directed to the downstream second fluidic device 110C-2 to provide further growth of the NPs, which in some embodiments of the present disclosure, as described in more detail below, may include the formation of rod-shaped nanoparticles, i.e., nanorods (NRs). In more detail, referring again to FIG. 5C, a gold precursor (i.e., first component) may be directed to the first fluidic device 100C-1 via inlet 160A-1 and a stabilizing ligand (i.e., second component) via inlet 160B-1, after which these two components are "pre-mixed" in a first zone. After premixing of the gold precursor and stabilizing ligand is achieved, a reductant may be introduced into the first fluidic device 100C-1 via inlet 160C, thus initiating the formation of gold NPs, which exit the device via outlet 170-1.

In some embodiments of the present disclosure, however, the NPs exiting a single fluidic device may not have the desired size and or shape. These initial NPs, referred to herein as "seeds", may, therefore, be directed to a second fluidic device to achieve the desired NP size and/or shape. Referring again to the embodiment illustrated in FIG. 5C, the "seeds" produced in the first fluidic device 110C-1 may be directed via a union 500 to a second fluidic device, where the "seeds" enter the second fluidic device 110C-1 via inlet 160A-2. In some embodiments, the seed NPs may be mixed with another component, which may be introduced via inlet 160B-2, for example water to provide a target concentration of seed NPs before the introduction of additional metal precursor via inlet 160C-2. With the addition of the metal precursor at inlet 160C-2, the seed NPs may then further form to achieve the final NP size and shape, which then exits at outlet 170-2. Note that the streams introduced at the inlets (160B-1 and 160C-1) of the second fluidic device 100C-2 may include a mixture of components; e.g., additional reductant, additives to help induce the formation of a particular shape, e.g., NRs. Experiments directed to the use of a system like that illustrated in FIG. 5C are provide in detail below.

Figure 6A:
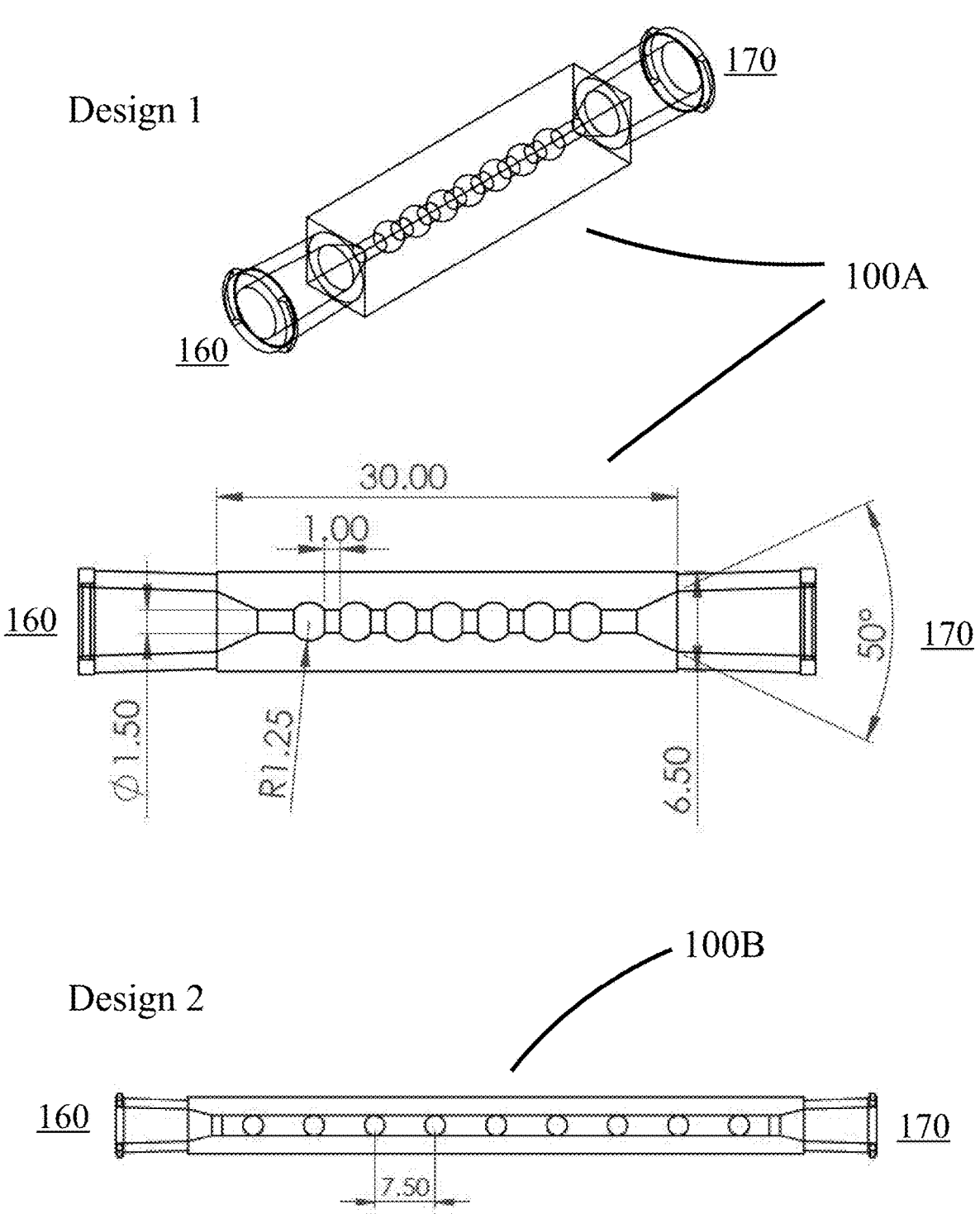
FIG. 6A illustrates two single-pass fluidic mixing devices, according to some embodiments of the present disclosure.
Figure 6B:
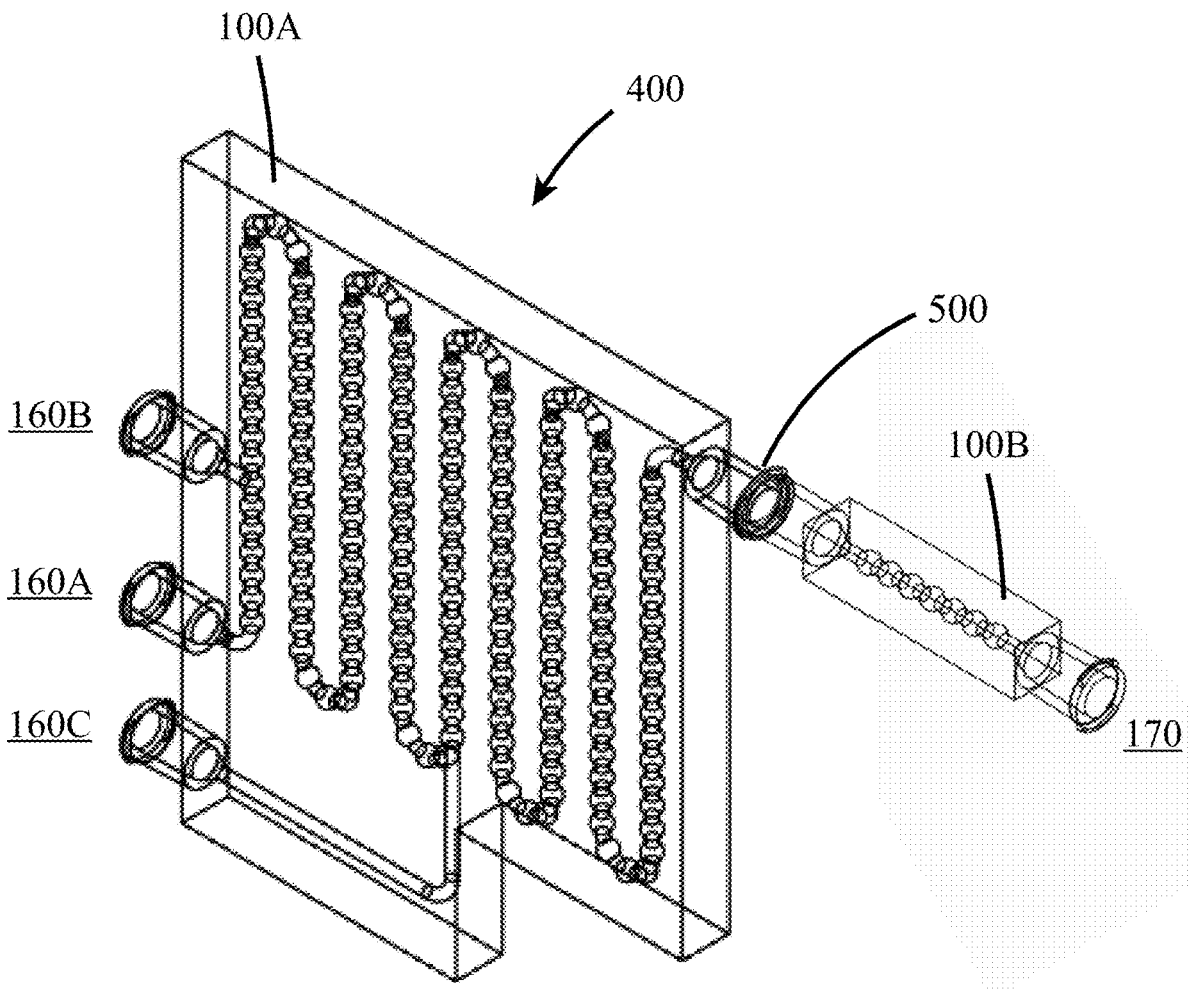
FIG. 6B illustrate an exemplary system that includes two fluidic mixing devices connected in series, according to some embodiments of the present disclosure.

In some embodiments of the present disclosure, a system 400 may include a simplified fluidic device 100, where the channel 110 is a single run 120 positioned between an inlet 160 and an outlet 160. FIG. 6A illustrates two such fluidic devices (100A and 100B), according to some embodiments of the present disclosure. The fluidic device designs illustrated in FIG. 6A are referred to herein as "single-run" fluidic devices. The dimensions shown in FIG. 6A are for illustrative purposes and are not intended to be limiting. FIG. 6B illustrates an exemplary system 400, that combine a first, more complicated fluidic device 100A, with a second, downstream "single-run" or "single-pass" fluidic device 100B.

In some embodiments of the present disclosure, multiple fluidic devices may be connected in series to provide additional volume, a larger number of mixing elements, and/or residence time to provide additional mixing and/or opportunity for reacting. In some embodiments of the present disclosure, if additional mixing is not needed, and only additional residence time, tubing and/or piping may be utilized to connect a first fluidic device 100A with a second fluidic device 100B, as illustrated in FIG. 5B. FIGS. 5A, 5B, 5C, 6A, and 6B demonstrate that the fluidic devices 100 described herein may be designed to be modular and interchangeable.

Figure 7A:
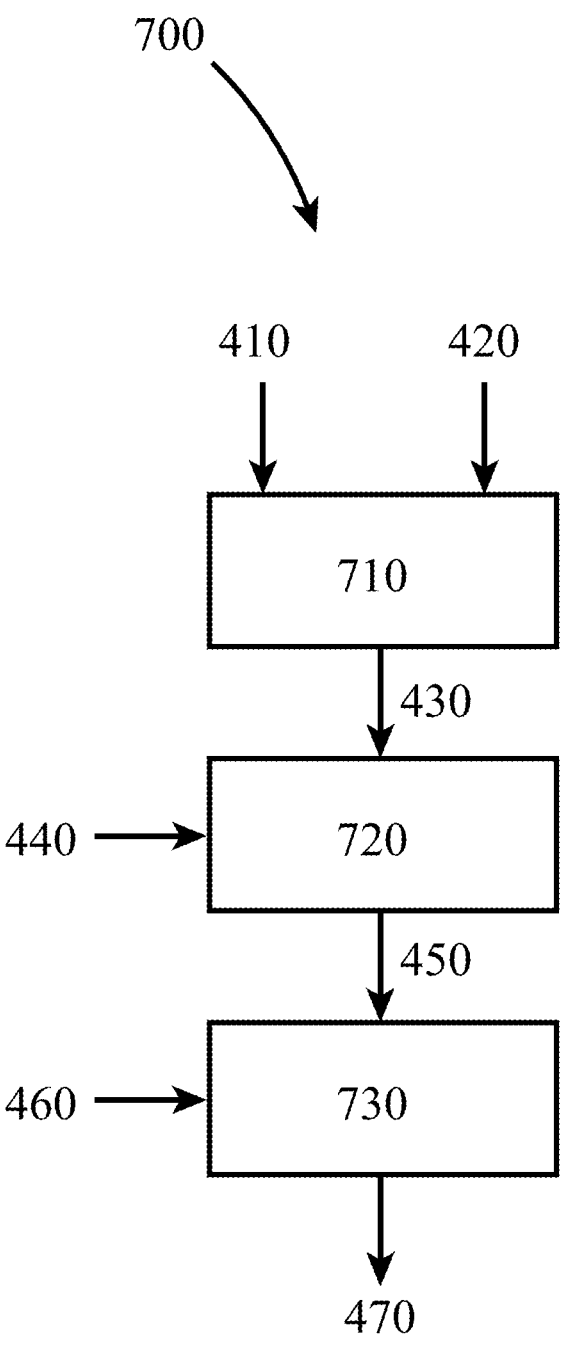
FIG. 7A illustrates a method for synthesizing metal NPs, according to some embodiments of the present disclosure.

FIG. 7A illustrates a method for producing metal NPs, according to some embodiments of the present disclosure. This exemplary method 700 begins with the combining of a first component 410 (e.g., metal precursor) with a second component 420 (e.g., stabilizing ligand) in a first mixing 710 step to produce a first mixture 430. The first mixture 430 may then be combined with a third component 440 (e.g., reductant) in a second mixing 720 step to produce a first product 450 that includes, for example, metal NPs (e.g., Au NPs). In some embodiments of the present disclosure, a method 700 may include one or mixing steps.

This exemplary method 700 is provided for illustrative purposes only and is not intended to be limiting. For example, a method may include two or more components that are mixed in one or more mixing steps to produce one or more mixtures, with one or more mixtures containing metal NPs. In some embodiments of the present disclosure, a fluidic device may be constructed of a series of zones configured to provide mixing, where each zone is integrated into a single fluidic device and/or modularized into separate fluidic devices connected in series. Each zone may have at least one liquid stream directed to it, i.e., a first mixture, with the stream exiting the mixing zone, referred to herein as a second mixture. The number of components, mixing steps, and/or mixtures will depend upon the chemical and/or physical properties of the final targeted metal NPs and/or the chemical and/or physical properties of the components used to produce the metal NPs. For example, referring to the synthesis of Au NPs described above, a method may include a first mixing 710 of a first component 410 (e.g., gold precursor) and a second component 420 (e.g., stabilizing ligand). These two components (410 and 420) may be stored separately to avoid premature and/or uncontrolled reactions and/or aggregation resulting in undesired variability to the final Au NPs produced. Once the first component 410 (e.g., gold precursor) and the second component 420 (e.g., stabilizing ligand) have been appropriately mixed in the first mixing 710 step, for example to obtain a uniform concentration of the gold precursor in the stabilizing ligand, the resultant first mixture 430 may be combined with a third component 440 (e.g., reductant), in a second mixing 720 step, where the reactions to produce the final targeted Au NPs can occur in a controlled environment, enabling the production of Au NPs contained in the first product mixture 450, where the Au NPs have the desired physical and/or chemical properties.

Referring again to FIG. 7A, in some embodiments of the present disclosure, the metal NPs (e.g., Au NPs) themselves (i.e., unsupported) may be the desired final product, which may be separated from the first product mixture 450 to produce metal NPs and a solvent stream, e.g., water (separation step and the two resultant streams not shown in FIG. 7A). In some embodiments of the present disclosure, it may be desirable to place metal NPs onto a support, for example a solid support such as a carbon, e.g., Vulcan XC 72R, as described above. Therefore, the method 700 illustrated in FIG. 7A shows a third mixing 730 of the first product mixture 450 (e.g., Au particles suspended in a solvent) with a fourth component 460 (e.g., a solid carbonaceous material), resulting in the formation of a second product mixture 470, e.g., a solution containing plurality of metal NPs deposited on a solid support. The metal NPs/solid support product (e.g., catalyst) may then be separated (not shown) from the other constituents (e.g., solvent, unreacted precursor, etc.) to form a purified final product of metal NPs deposited on a solid support (these steps not shown in FIG. 7A). In some embodiments of the present disclosure, the first product mixture 450 may contain metal NPs that do not have the desired physical properties, e.g., size and shape. Thus, these "seed" NPs may be directed to a third mixing 730, where, among other things, additional metal precursor (fourth component 460) may be added to enable additional NP growth to occur, resulting in changes to the at least one of the particle size and/or shape.

In more detail, a method for synthesizing metal NPs may include a first synthesis of metal NPs, which may be used as seeds that can grow by the additional deposition of metal onto the seeds. For example, a first component (e.g., $H_2O$) may be combined with a second component (e.g., metal seeds) in a first mixing step to produce a first mixture. The first mixture may then be combined with a third component (e.g., growth solution) in a second mixing step to produce a product that includes, for example, metal nanorods (e.g., Au NRs). This exemplary method is provided for illustrative purposes only and is not intended to be limiting. For example, a method may include two or more components that are mixed in one or more mixing steps to produce one or more mixtures, with one or more mixtures containing metal NPs. In some embodiments of the present disclosure, a fluidic device may be constructed of a series of zones configured to provide mixing, where each zone is integrated into a single fluidic device and/or modularized into separate fluidic devices connected in series. Each zone may have at least one liquid stream directed to it, i.e., a first mixture, with the stream exiting the mixing zone, referred to herein as a second mixture. The number of components, mixing steps, and/or mixtures will depend upon the chemical and/or physical properties of the final targeted metal NPs and/or the chemical and/or physical properties of the components used to produce the metal NPs.

In some embodiments of the present disclosure, the metal NPs (e.g., Au NRs) themselves (i.e., unsupported) may be the desired final product, which may be separated from the first product mixture to produce metal NPs and a solvent stream, e.g., water (separation step and the two resultant streams). In some embodiments of the present disclosure, it may be desirable to place metal NPs onto a support, for example a solid support such as a carbon, e.g., Vulcan XC 72R, as described above. Therefore, the method may include a third mixing of a first product mixture (e.g., Au nanorods suspended in a solvent) with a fourth component (e.g., a solid carbonaceous material), resulting in the formation of a second product mixture, e.g., a solution containing plurality of metal NPs deposited on a solid support. The metal NPs/solid support product (e.g., catalyst) may then be separated (not shown) from the other constituents (e.g., solvent, unreacted precursor, etc.) to form a purified final product of metal NPs deposited on a solid support.

Thus, in some embodiments of the present disclosure, the generalized method 700 illustrated in FIG. 7A can be used to produce both supported and unsupported Au NPs, both spherical and rodlike in shape. However, this is for illustrative purposes only and is not intended to be limiting. The method illustrated in FIG. 7A may be designed as needed to produce a variety of other metal NPs (e.g., Ag, Pt, Pd, Co, Cu, Ni). In some embodiments, the methods described herein may be used to produce one or more metal NPs of differing elemental compositions, simultaneously in a single step or multiple steps. Also, the exemplary gold precursor, stabilizing ligand, and reductant described above are not intended to be limiting. Other stabilizers, precursors, reductants, and/or other suitable materials may be used. For example, other gold precursors, the first component 410, may include gold seeds, prepared in advance through traditional chemical reduction methods, and/or gold salts such as $KAuCl_4$. Examples of other stabilizing ligands, the second component 420, may include phosphines, amines, thiols, tetraoctylammonium bromide (TOAB), cetyltrimethylammonium bromide (CTAB) and/or polyvinylpyrrolidone (PVP). Examples of reductants, the third component 440, may include sodium borohydride, hydrazine, trisodium citrate (at elevated temperatures), and/or ascorbic acid. Examples of solvents for metal NP formation include water, toluene, alcohols, and/or ionic liquids. Examples of solid supports, e.g., the fourth component 460, onto which NPs may be deposited include carbon, silica, alumina, zeolites, and/or metal oxides (e.g., $ZrO_2$, $TiO_2$).

Figure 7B:
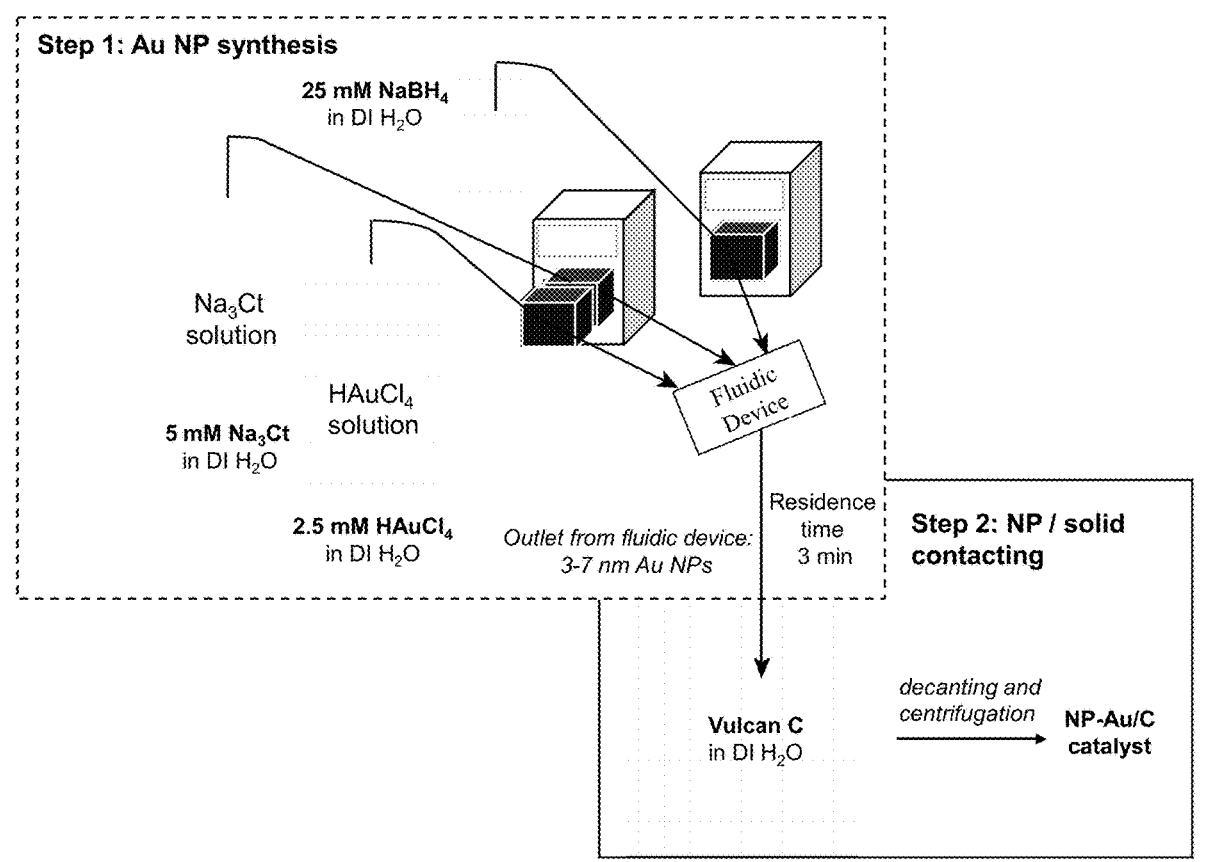
FIG. 7B illustrates a schematic of a continuous system for catalyst synthesis that involves both NP synthesis through a fluidic device having serpentine channels to promote mixing (dashed box) and a subsequent step for depositing the NPs on a solid support (solid box), according to some embodiments of the present disclosure. Concentrations, residence times, and other metrics provided as examples.
Figure 7C:
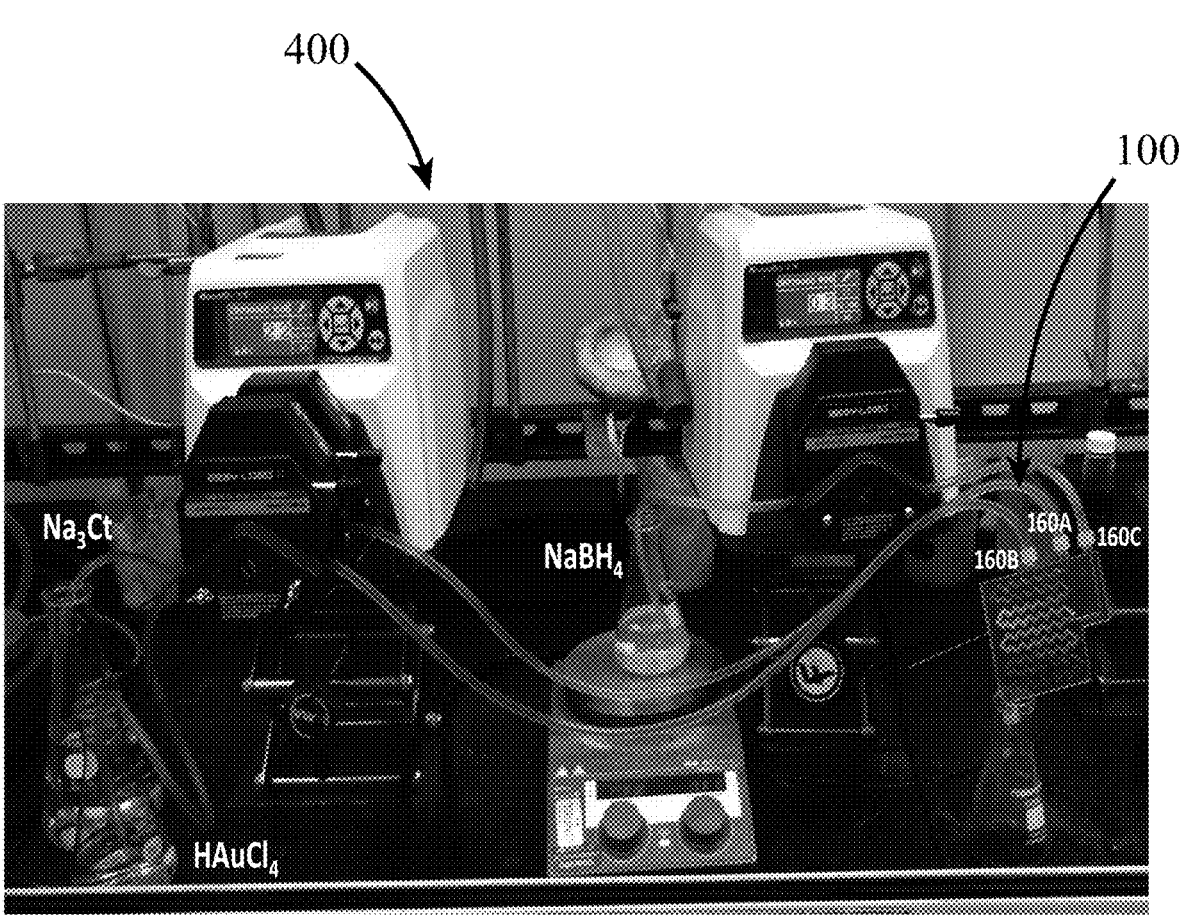
FIG. 7C illustrates an exemplary system for synthesizing gold nanoparticles (Au NPs) using a fluidic device having serpentine reaction channels, according to some embodiments of the present disclosure. Not shown in FIG. 7C; Au NPs can be deposited directly into carbon supporting matrix following exit from tubing connected to the outlet (see FIG. 7B). Au NP formation was observed only after addition of the reductant at the third inlet as seen by the higher contrast of the section following the third inlet (160C).

FIGS. 7B and 7C illustrate a line drawing and a photograph, respectively, of an actual system 400 used to product Au NPs, according to some embodiments of the present disclosure. Stock reagent solutions were kept separate until contacted in the premixing zone because control experiments indicated that a metal precursor (e.g., $HAuCl_4$) and a stabilizing ligand (e.g., $Na_3Ct$) can react to form large metal (e.g., Au) aggregates, prior to introduction of the initiator solution (e.g., $NaBH_4$). Therefore, as shown herein, the separation of the metal precursor solution and the ligand solution increases the accessible parameter space of this synthetic system (i.e., by providing independent control over metal precursor and ligand concentrations, flow rates, and residence times). Following the combining of the metal precursor and stabilizing ligand (e.g., $HAuCl_4$ and $Na_3Ct$, respectively) solutions in the premixing zone, i.e., first zone 135A, of the fluidic device 100, a reductant (e.g., $NaBH_4$) was introduced to the reaction mixture via a third inlet 160C leading to the second zone 135B in the fluidic device 100.

In some embodiments of the present disclosure, temperature baths can be added to vary the temperature of the stock solutions fed to a fluidic device, for example, to maintain a temperature between about 0° C. and about 80° C. For example, a reductant may be maintained, stored and/or fed to a fluidic device at a temperature of about 0° C. to increase the solution stability of the reductant. In some embodiments of the present disclosure, one or more of the components used in a fluidic device may be maintained, stored, and/or directed to a fluidic device at about room temperature (e.g., between about 10° C. and about 30° C.). Other process variables that can be modified include residence time of the components passing through a fluidic device. For example, the residence time of a component and/or mixture of components may be in a range between about 1 minute and about 1 hour, achieved by varying at least one flow rate of a component, by varying at least one dimension of a zone within the fluidic device (e.g., channel width, length, etc.), and/or by varying the length of the outlet tubing. Furthermore, the reaction chemistry, kinetics, etc., may be controlled by making changes to the concentrations of the components. For example, a gold precursor (i.e., first component 410) may be directed to a fluidic device at a concentration between about 0.125 mM and about 5 mM, a stabilizing ligand (i.e., second component 420) at a concentration between about 0.25 mM and about 10 mM, and a reductant (i.e., third component 440) at a concentration between about 10 mM and about 25 mM. For the examples described herein, the concentrations of each component were maintained at 2.5 mM, 5.0 mM, and 25 mM, respectively. Among other things, modification of these parameters can be used to control the metal NP properties including size and polydispersity. At these concentrations, using only a single fluidic device, with and without additional downstream tubing, the Au NPs formed were spherical in shape with a characteristic diameter between about 3.5 nm and about 7 nm.

The fluidic devices described above were tested in the laboratory. Nevertheless, these devices achieved relatively high gold NP production rates between about 100 mg metal NP/hr and 312 mg NP/hr. The plug-and-play modularity of the fluidic devices, raw material feed components, and downstream unit operations (e.g., providing additional residence time and or depositing the NPs onto a support) described herein may be relatively easily combined to yield systems capable of manufacturing NPs at scales, conceivably as high as between about 1 g and 10 g metal NP/hr. For example, higher metal NP production rates may be achieved by operating two or more fluidic devices in parallel.

As described above, the product of the current embodiment may be used in the production of NP seeds, making it amenable to downstream particle growth strategies at large scale. For example, the first step of seeding the NPs may be achieved by placing multiple fluidic devices in parallel, where each fluidic device is equipped with it own reactant feed inlets and an outlet. In some embodiments of the present disclosure, the NP seed product exiting from each respective device, may be combined into a single stream, which is then directed to a unit operation for completing the NP growth step. In some embodiments of the present disclosure, such a unit operation for NP growth may simply be an empty volume that provides the time needed to achieve the targeted NP particle size (e.g., less than 10 nm). In some embodiments of the present disclosure, the empty volume for providing the time needed for NP growth may be provided by a tube, pipe, channel, vessel, and/or any other suitable conduit. In some embodiments of the present disclosure, the empty volume provided for NP growth may be between 1 liter and about 10 liters, or between about 1 liter and about 4 liters. In some embodiments of the present disclosure, the empty volume needed for NP growth to occur, may provide between 10 seconds and 60 minutes of residence time, or between about 16 seconds and 20 minutes.

In some embodiments of the present disclosure, the combined NP flow exiting the multiple fluidic devices, and/or exiting a tube, pipe, vessel, etc., that provided additional time for NP growth, may be directed to a downstream unit operation for depositing the metal NPs onto a solid support. As described above, in some embodiments of the present disclosure, a stirred-tank may be used for depositing metal NPs onto a solid support, for example for depositing gold nanoparticles onto a carbon support. In some embodiments of the present disclosure a vessel for depositing metal NPs onto a solid support may have an empty volume between 0.5 liter and 40 liters, or between 1 liter and 20 liters. In some embodiments of the present disclosure, a vessel for depositing metal NPs onto a solid support may provide a residence time between 20 minutes and 24 hours, or between 1 hour and 3 hours.

Further, in some embodiments of the present disclosure, multiple fluidic devices may be constructed within a single 3D block of material. For example, in some embodiments of the present disclosure, a fluidic device may have 2 or more channels like those illustrated in FIG. 3, where each channel is positioned within a plane and where the plane of each channel is positioned substantially parallel to the planes of the remaining channels. In some embodiments of the present disclosure, each channel in a multi-channel fluidic device may have its own inlet(s) and outlet. In some embodiments of the present disclosure, a multi-channel fluidic device may have only a single inlet for each reactant, wherein the fluidic device is configured to contain an internal manifold that distributes each of the reactants to each of the channels contained within the fluidic device. Similarly, in some embodiments of the present disclosure, the product from each channel may be combined into a single outlet that exits the fluidic device.

Further, in some embodiments of the present disclosure, a fluidic device may be constructed of a 3D block of material that is constructed from at least one of a plastic, a polymer, a resin, a glass, a ceramic, and/or a metal. In some embodiments of the present disclosure, a fluidic device may be constructed of a metal, that among other things, enables operating the fluidic device at elevated temperatures (e.g., between room temperature and 200° C.) and/or elevated pressures (e.g., between atmospheric pressure and 10 atm of pressure).

Results

Referring again to FIGS. 2A-2C and 3 and Table 1, three different fluidic devices were tested to produce Au NPs. Each device was designed using SolidWorks software and was fabricated using a Formlabs SLA 3D printer. Each fluidic device design was utilized in a continuous flow system, as illustrated in FIGS. 7B and 7C. Briefly, room temperature solutions of the Au(III) precursor (2.5 mM) (first component 410) and stabilizing ligand (5 mM) (second component 420) were injected into the first two inlets (160A and 160B, respectively) using a peristaltic pump equipped with two pump heads. A stock solution of 25 mM $NaBH_4$ (reductant, third component 440), at a feed temperature of about 0° C. ($HAuCl_4$ and $Na_3Ct$ both added at room temperature), was injected into the third, downstream inlet 160C of the fluidic device 100A using a second peristaltic pump. 3.1 mm Tygon® tubing was attached to the outlet of the 3D-1 fluidic device, whereby the tubing length (about 10.7 m of Tygon® tubing having an inner diameter (ID) of about 3.1 mm) and precursor solution flow rates were calculated to maintain a total residence time of about 3 minutes (i.e., time of reagent mixing in the mF device (about 0.2 minutes) and tubing (about 2.8 minutes)). Thus, this tubing performed the role of a third zone 135C, positioned external to and downstream of the fluidic device 100.

Figure 8A:
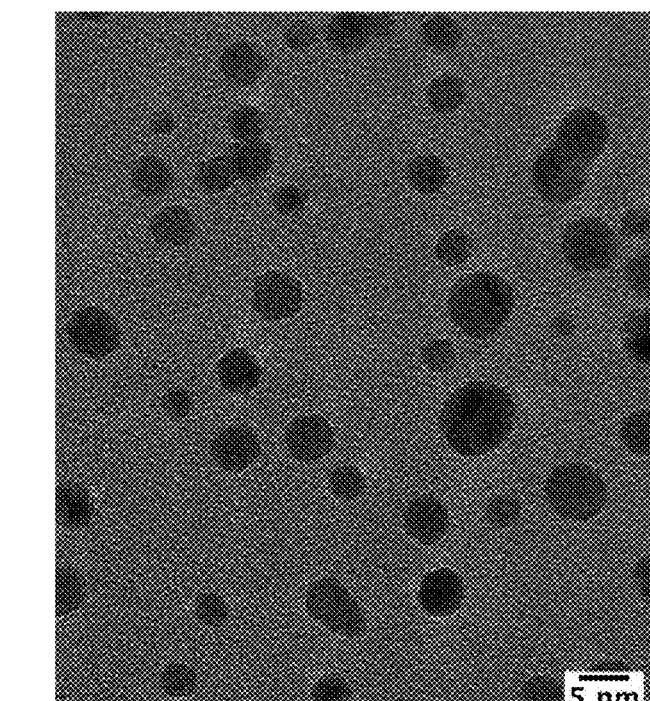
FIG. 8A illustrates a representative transmission electron microscopy (TEM) image (Panel A) and UV-Vis spectrum (Panel B) of Au NPs synthesized using a fluidic device designed for >300 mg h$^{-1}$ continuous flow (design 3D-3, see FIGS. 2C and 3) with a residence time of about three minutes, including residence time in tubing downstream of the fluidic device, according to some embodiments of the present disclosure.
Figure 8A:
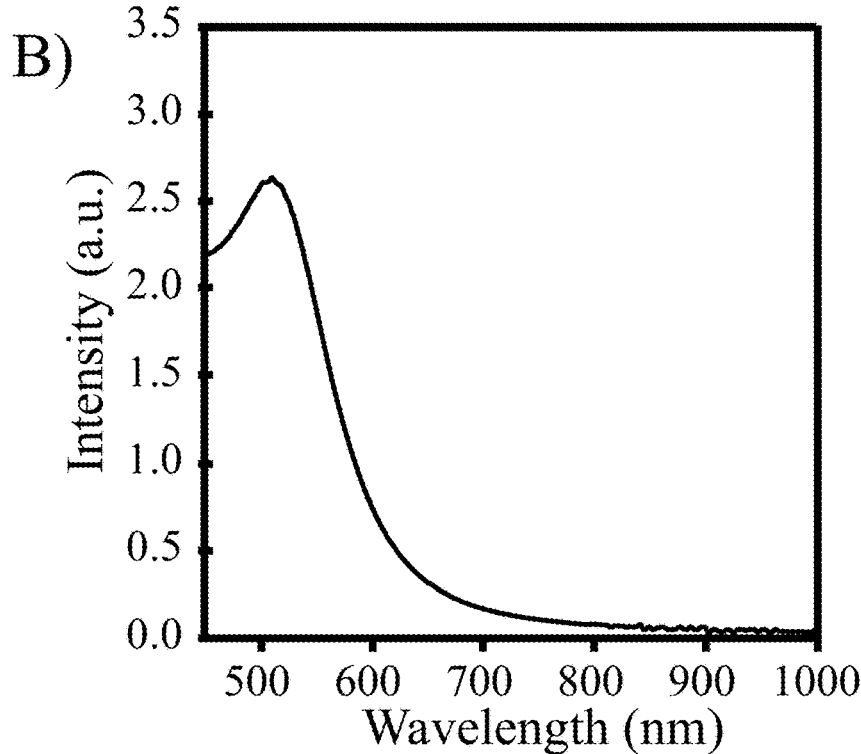

Successful exemplary reactions were completed using the 3D-1 device design, utilizing a total residence time of about three minutes (i.e., time of reagent mixing in the fluidic device and tubing), resulting in the formation of Au NPs with characteristic diameters between about 3.5 nm and about 7 nm (see FIG. 8A). In this example, after the initial mixing in the fluidic device, the $HAuCl_4/Na_3Ct$ and $NaBH_4$ were directed through a length of about 10.75 m of 3.1 mm ID tubing to achieve a total residence time of about 3 minutes (i.e., a residence time of about 0.2 minutes (12 seconds) time in the 3D-1 design, described below, with an additional 2.8 minutes of residence time in the downstream tubing, at a total flow rate of 27.6 mL min$^{-1}$).

Notably, exemplary reactions were completed using the 3D-1 device without any additional outlet tubing (i.e., about 0.25-minute residence time using a total flow rate of about 7.8 mL min$^{-1}$), resulting in formation of Au NPs with characteristic diameters between about 3.5 nm and about 5.5 nm (see FIG. 8B). these results suggest that the residence time and tubing length could be decreased without changing the NP properties.

In some embodiments of the present disclosure, the effluent from the fluidic device containing the NPs was subsequently directed to a vessel containing a portion of activated carbon (at a target of 25 wt % Au loading, with a probable achievable range between about 5 wt % and about 35 wt % Au loading) in about 0.5 gal DI water. The vessel was stirred at 400 RPM using an overhead mixer affixed to a PTFE paddle mixer. The direct release of Au NPs into a solution containing carbon particles successfully resulted in the deposition and immobilization of the Au NPs onto the carbon support without the need for any preparatory treatment and/or processing.

In this example, Au NPs were deposited onto a carbon (Cabot, Vulcan XC72R) by directly releasing Au NPs into a vessel containing Vulcan carbon in DI water (see FIG. 7B). The resultant supported material (NP—Au/C catalysts) was subsequently separated and recovered by decanting and centrifugation, resulting carbon supported Au NPs, e.g., catalyst, with an Au loading up to 30 wt %, relative to the total catalyst weight. Thus, the experiments described herein demonstrate the feasibility of an automated continuous process that both synthesizes metal NPs and subsequently deposits the metal NPs onto a solid support to form supported metal compositions (e.g., NP—Au/C). As shown herein, in some embodiments of the present disclosure, some materials with up to 30 wt % Au loading (mass Au/(mass Au+carbon) were successfully synthesized. Among other things, these carbon-supported metal NPs may be utilized as catalysts in a variety of industrially important reactions, including $CO_2$ valorization, CO oxidation, and hydrogenation of organic compounds.

To determine optimal flow parameters for Au NP synthesis using the 3D-1 fluidic device design, screening studies with varying $NaBH_4$:$HAuCl_4$ molar ratios (B:Au) were conducted. These studies were important to achieve significantly increased concentrations and thus, increased NP throughputs (i.e., mass Au NPs (mg) per hour). A theoretical Au NP (unsupported) throughput of about 330 mg h$^{-1}$, per 3D-1 fluidic device, was targeted. Preliminary flow experiments using a relatively highly concentration of reductant solution (100 mM $NaBH_4$) resulted in a significantly decreased $NaBH_4$ flow rate, relative to that of $HAuCl_4/Na_3Ct$ (i.e., 0.1 vs. 8.2 mL/min, respectively) to maintain a target ratio consistent with those utilized in the traditional Turkevich batch procedure for Au NP formation of about 1:1 B:Au. As a result of the low reductant flow rate, inadequate mixing was observed at these conditions in the fluidic device tested, the 3D-1 design, as the relatively slow addition of the concentrated $NaBH_4$ solution resulted in a significant amount $H_2$ gas evolution, resulting in regions of unreacted precursor solution within the fluidic device. UV-Vis spectroscopy was used to qualitatively determine Au NP yield, specifically through determination of the absorbance intensity of the localized surface plasmon resonance ($A_{LSPR}$). As a result of the poor mixing achieved due to gas formation, Au NP formation using 100 mM $NaBH_4$ solution resulted in a relatively intermediate concentration level of Au NPs, as determined by a value of about 1.5 $A_{LSPR}$ by UV-Vis (relative to high (i.e., $\geq 2$) and low (i.e., $\leq 1$) as the upper and lower bounds for $A_{LSPR}$ measured in the B:Au screening studies).

Figure 10A:
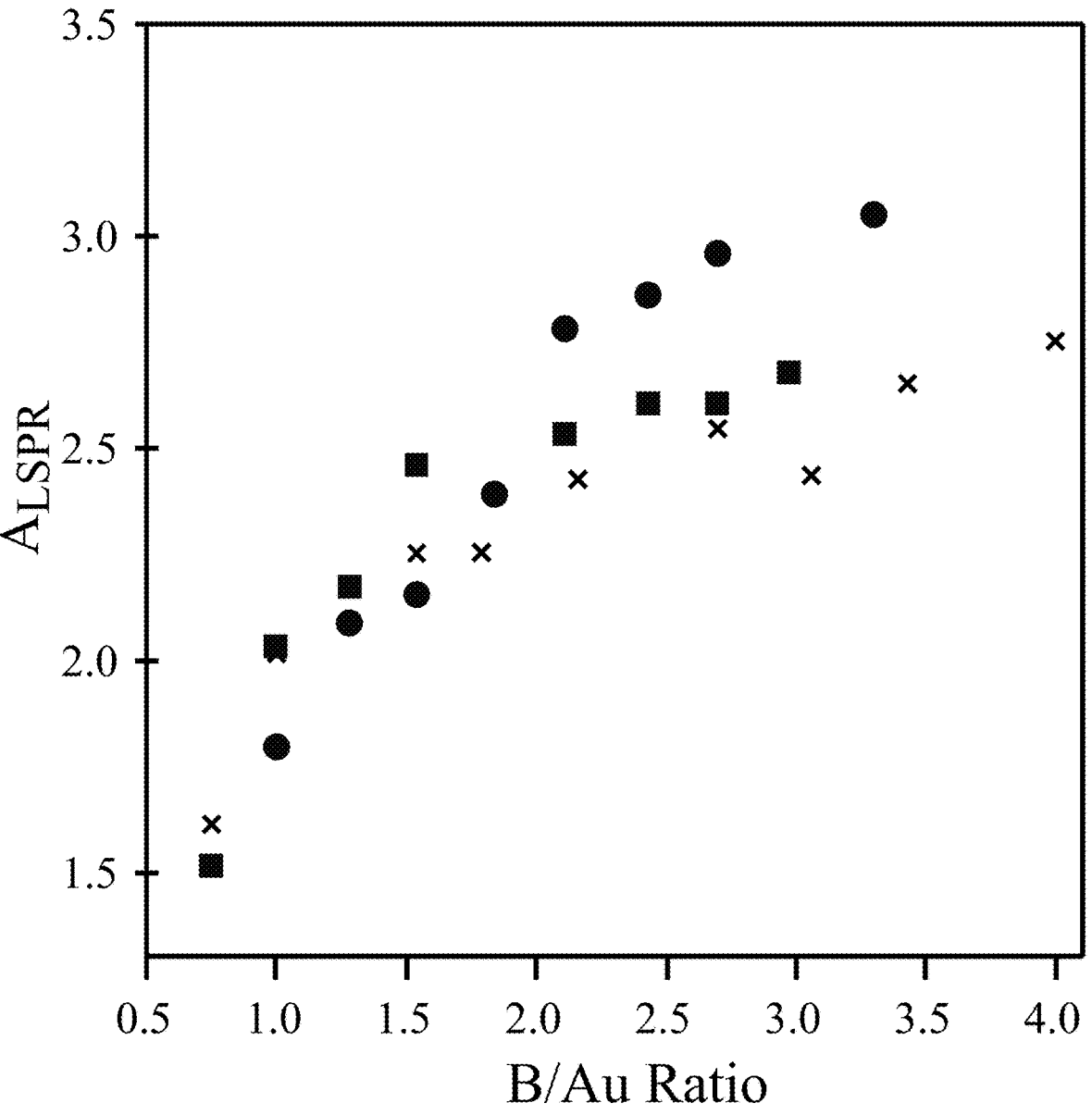
FIG. 10A illustrates surface plasmon resonance absorbance ($A_{LSPR}$) from UV-Vis spectroscopy data obtained for the serpentine fluidic devices (see FIG. 3), 3D-1 (x), 3D-2 (circle), and 3D-3 (square), according to some embodiments of the present disclosure. These results were used to calculate the effect of B/Au ration on metal particle size, as shown in FIG. 10B. The NaBH$_4$ concentration for all B:Au screening studies was 25 mM.
Figure 10B:
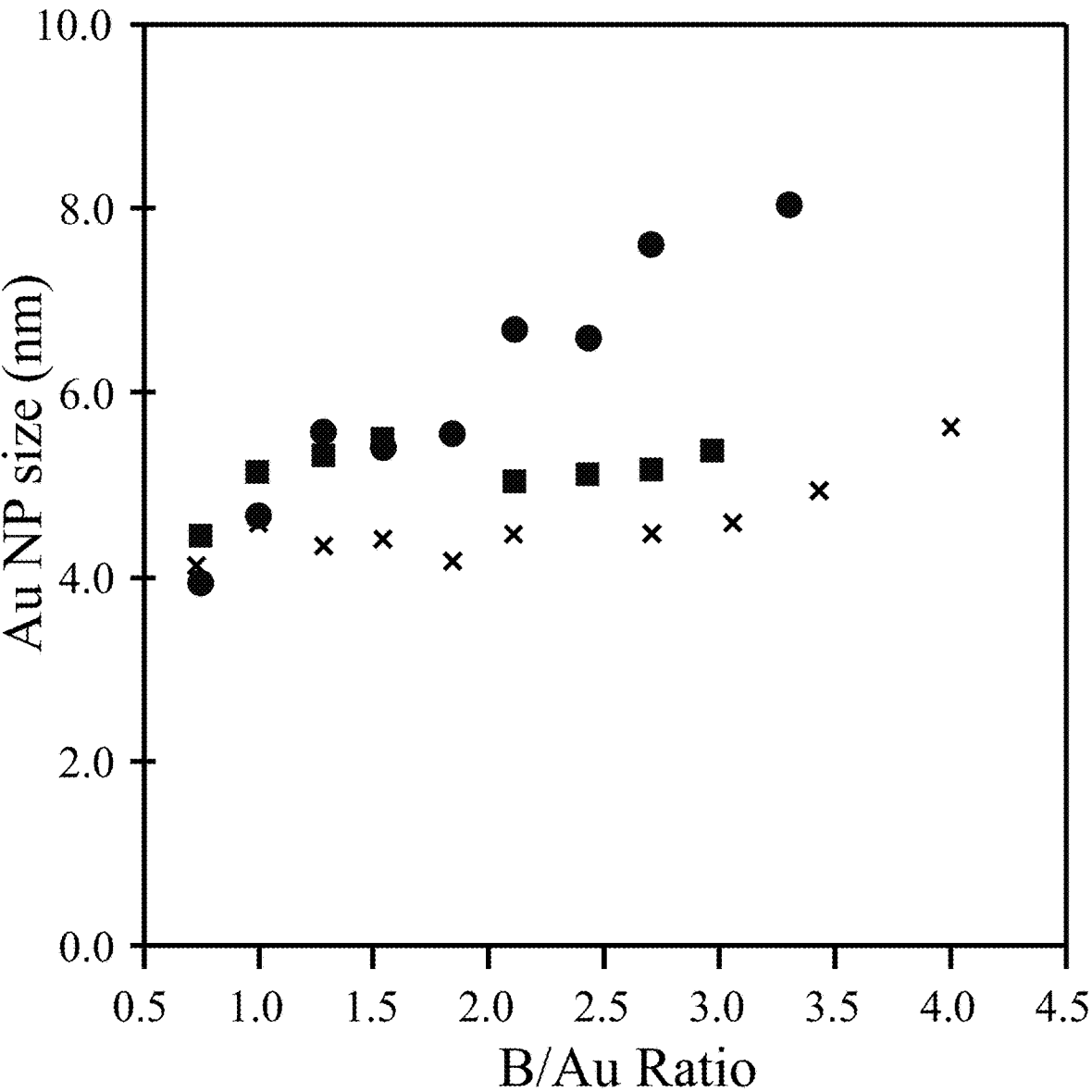

To gain improved control over Au(III) reduction, the concentration of $NaBH_4$ was decreased from 100 mM to 25 mM and the $NaBH_4$ flow rate was re-evaluated by testing the 3D-1 fluidic design using a series of B/Au molar ratios (see FIGS. 10A and 10B; 3D-1 data set corresponds to x symbols). The residence time was maintained at about 3 minutes within these studies to keep the reagent mixing time consistent between all mF device tests in this series of experiments. Analysis of the change in $A_{LSPR}$ as measured by UV-Vis with varying flow rates of the 25 mM $NaBH_4$ solution revealed that B/Au molar ratios between 1.3:1 and 2.7:1 significantly increased the $A_{LSPR}$ measurement in comparison to initial investigations using the 100 mM reductant solution. Increasing the B:Au molar ratio to 4:1 or above resulted in black-purple Au NP solutions, suggestive of the formation of large Au-aggregates. These results confirm that the amount of reductant directly influences the properties and concentration/yield of Au NPs formed in the fluidic device tested. Notably, experiments with B:Au between about 2:1 and about 3:1 resulted in NP sizes having characteristic diameters between about 6.5 nm and about 7.5 nm, as determined by UV-Vis spectroscopy (see FIG. 10A), and maximum $A_{LSPR}$ intensities (between about 2.8 and about 3.0; FIG. 10B) within error of the analysis technique. As such, a molar feed ration of B:Au of about 2.4:1 was determined as an optimum target for the reaction to produce Au NPs using the 3D-1 design of the fluidic device, reactants, and reaction conditions tested in this series of experiments.

With the operating conditions established for maximized Au production rates using the 3D-1 design of the fluidic device, a 100 mg Au NP h$^{-1}$ 1-hour flow experiment was conducted to assess the efficacy of the design and established parameters. The $HAuCl_4/Na_3Ct$ and $NaBH_4$ flow rates were set to 3.7 and 0.9 mL/min, respectively, to achieve a residence time of 3 minutes. TEM image analysis of the unsupported 3D-1-Au NPs revealed an average characteristic diameter of 5.2±1.5 nm (see FIG. 9). ICP-OES analysis of the Au NPs generated in the 3D-1 design confirmed that a high yield of 85% was achieved, resulting in a NP throughput of 90 mg h$^{-1}$. Overall, high precursor concentrations (1.25 mM $HAuCl_4$ after pre-mixing with $Na_3Ct$), with yields as high as 85% results in an overall throughput of about 90 mg h$^{-1}$ L$^{-1}$. Table 2 below summarizes the experiments conducted for the results illustrated in FIGS. 8A, 8B, 9, 10A, and 10B.

As described above, the continuous flow fluidic device/system configuration can include a third mixing 470 step, resulting in the deposition of the metal NPs onto a solid support (e.g., NP—Au/C catalyst). Specifically, Au NPs generated in the 3D1-design of a fluidic device were deposited onto conductive carbon, at a target of 25 wt % Au loading, by directing the NP-containing solution (i.e., third mixture, 460) directly into a 1 liter vessel pre-loaded with an aqueous suspension of the conductive carbon support. After about 1 hour of stirring (i.e., 1:1 NP formation time: supporting duration), about 349 mg of Au/C catalyst was recovered by decanting and centrifuging (23.9 wt % Au loading, as confirmed by ICP-OES). TEM image analysis of the final Au/C catalyst showed an average diameter of 5.6±1.6 nm, revealing no significant size change resulted from the 1-hour mixing of the NPs with the solid support. This deposition method is less resource intensive (i.e., decreased solvent requirement and waste generation) and results in the generation of supported metal nanoparticles that can be used directly as heterogenous catalysts (i.e., no required work up, less overall time).

B/Au molar ratios experiments were also completed for the 3D-2 and 3D-3 fluidic designs. Studies similar to those performed for the 3D-1 design were conducted by varying B/Au ratios to evaluate the following: (1) high NP yield, investigated via $A_{LSPR}$ intensity in the UV-Vis spectra, (2) sub-10 nm NP size, calculated via UV-Vis size analysis, and (3) absence of a black NP solution, indicative of the formation of Au aggregates. Referring to FIGS. 10A and 10B, for both fluidic device designs (circles=3D-2 and squares=3D-3), B/Au molar ratios above 1.3:1 exhibited $A_{LSPR}$ intensities above 2, suggesting high yielding Au NP formation. While 3D-1 affords the highest $A_{LSPR}$ (see FIG. 10A), the Au NPs that are formed were found to be larger than that of 3D-2 and 3D-3 (see FIG. 10B). This is hypothesized to be a result of the less effective mixing of the NaBH$_4$ reductant and HAuCl$_4$ in the 3D-1 design, leading to seed growth to larger average Au NP diameters.

Evidence supporting the comparatively poor mixing of the reagent solutions flowing through 3D-1 design, compared to the 3D-2 and 3D-3 designs, was obtained upon investigating the point at which Au aggregation was observed, as determined (1) qualitatively by the formation of black/purple-tinted solution of Au NPs and (2) by the increase in the baseline absorbance in the UV-vis spectra (i.e., increase in the $A_{LSPR}$ between about 800-1000 nm which is typically <0.1). In the "right-angle" fluidic design, 3D-3, Au aggregation occurred at B/Au ratios above 4.0 whereas aggregate formation occurred at B/Au above only 3.3 for 3D-1. These results are consistent with the hypothesis that the higher improved mixing efficiency resulting from the channel perturbations in 3D-2 and 3D-3 results in more controlled Au(III) and NaBH$_4$ interactions. Generally, the $A_{LSPR}$ intensity difference between of 3D-2 and 3D-3 with varying B/Au were within error of the analysis technique (+/−0.07 nm) and thus, could not be differentiated. However, from a fabrication perspective, the spherical channel perturbations within the 3D-2 fluidic design were found to be prone to cupping defects where air or excess resin became trapped within the mixing element during fabrication, resulting in channel blockage. Due to the poor printing reproducibility of 3D-2 the right-angle mixer was selected for continued evaluation. The final optimized B:Au for Au NPs synthesized with the 3D-3 design was determined to be about 3.4:1, which resulted in NPs with characteristic diameters of about 4.4±1.2 nm, as determined by TEM imaging.

TABLE 2

Figure 8B:
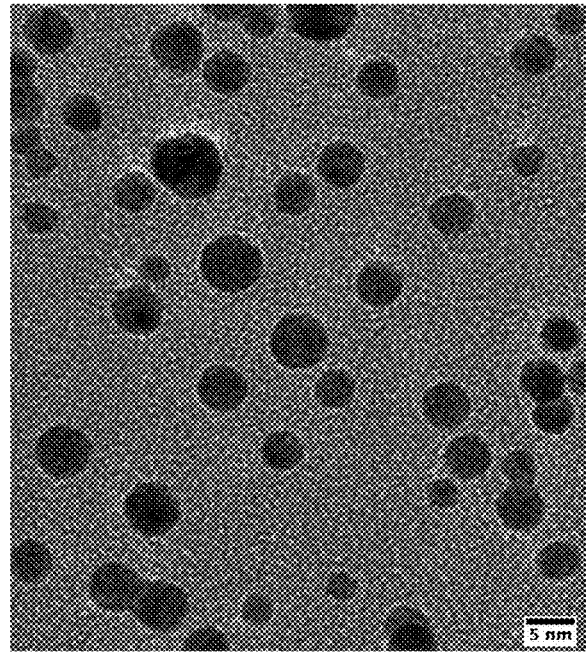
FIG. 8B illustrates a representative TEM image (Panel A) and UV-Vis spectrum (Panel B) of Au NPs synthesized using just the fluidic device of FIG. 2A, without additional downstream tubing, corresponding to a total residence time of about 0.25 minutes, all other parameters and conditions the same, according to some embodiments of the present disclosure.
Figure 8B:
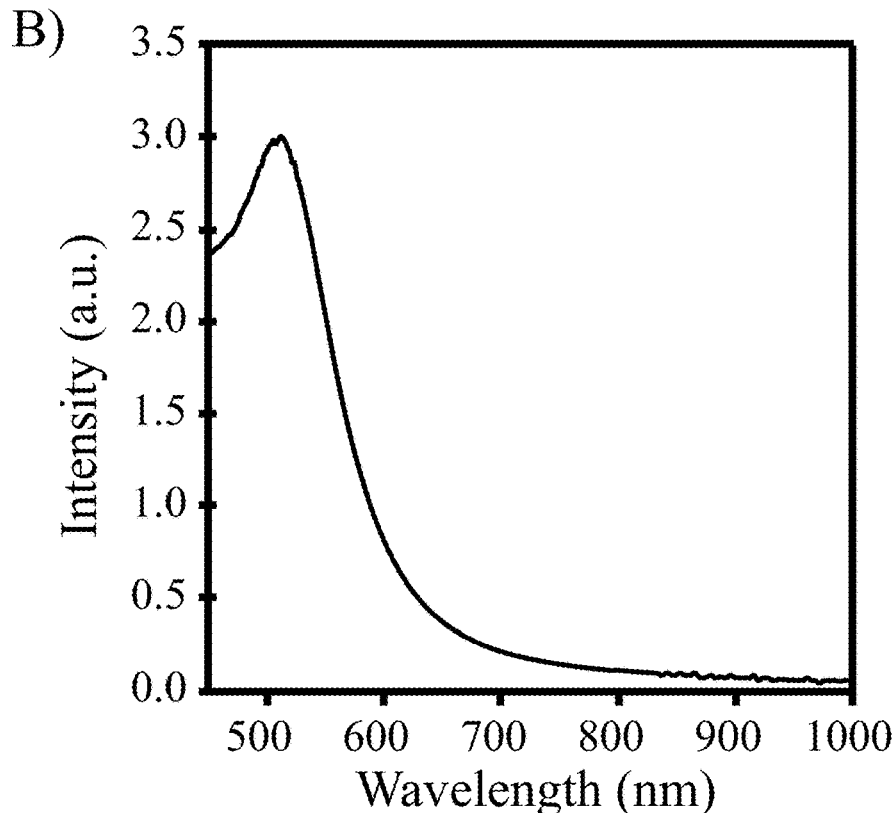
Figure 9:
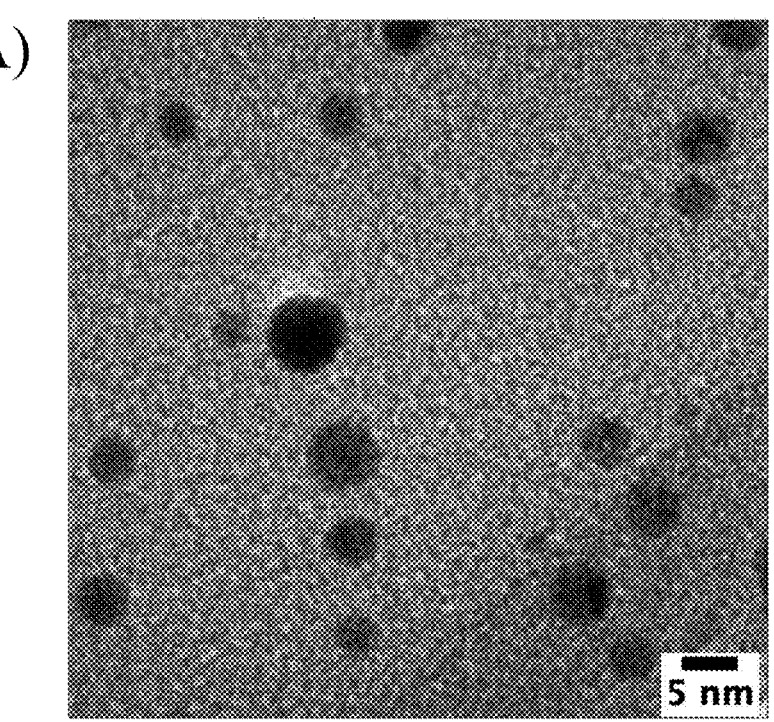
FIG. 9 illustrates a representative TEM image (Panel A) and UV-Vis spectrum (Panel B) of Au NPs synthesized using a fluidic device designed for <100 mg h$^{-1}$ continuous flow (design 3D-1, see FIGS. 2A and 3) with a total residence time of about three minutes, including residence time in tubing downstream of the fluidic device, according to some embodiments of the present disclosure.
Figure 9:
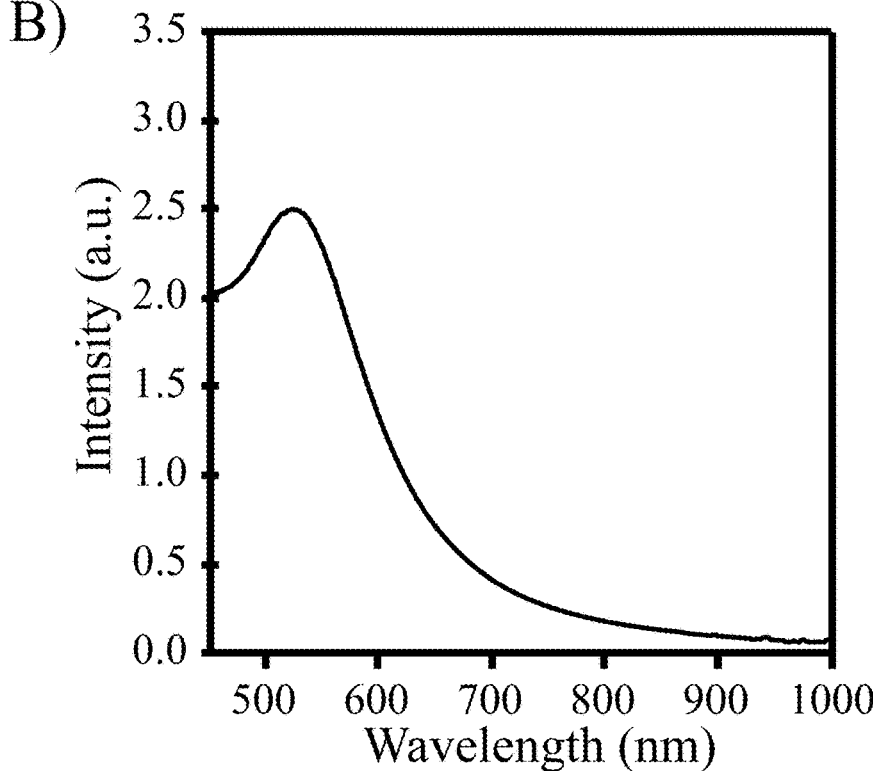
Figure 11:
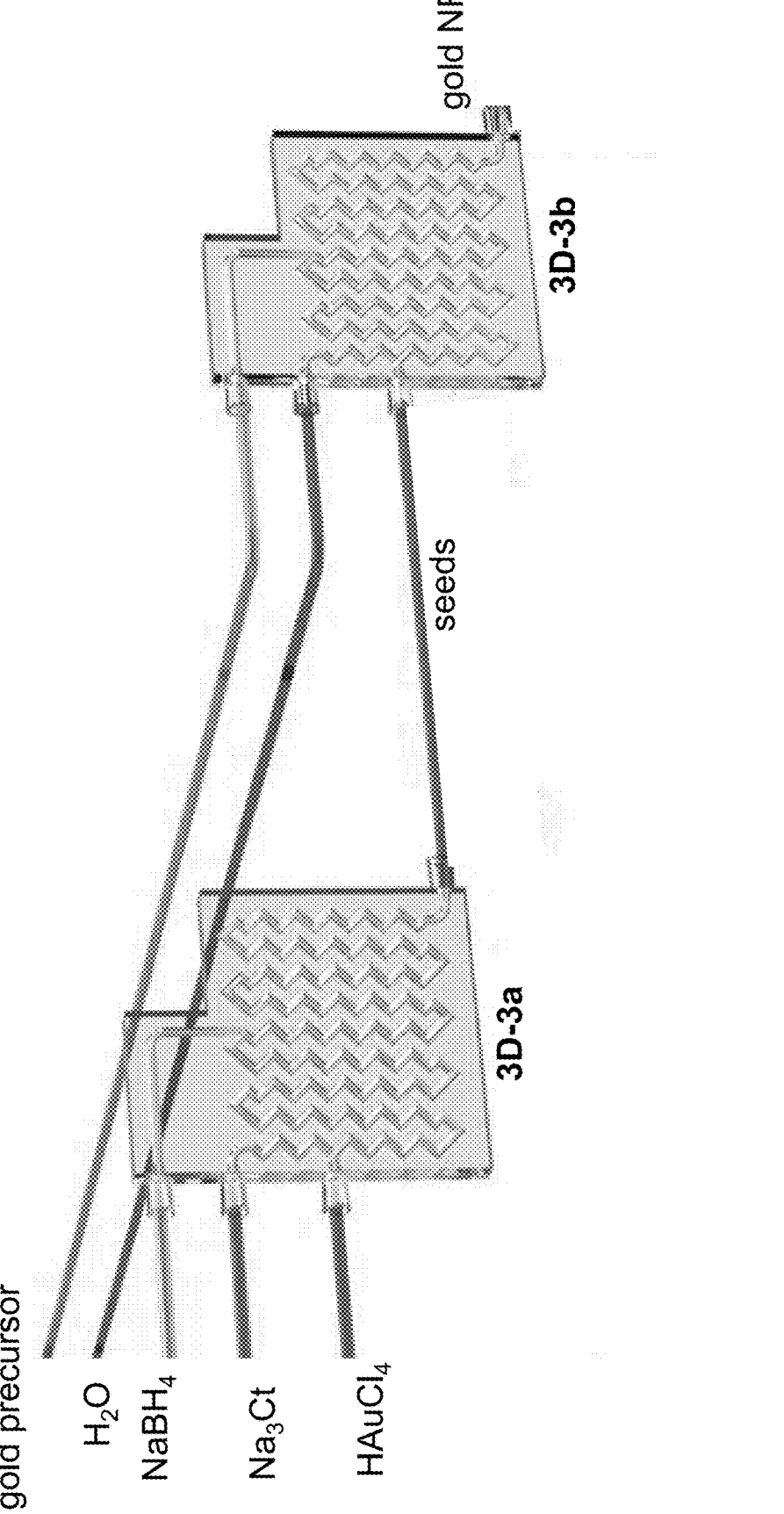
FIG. 11 illustrates a continuous system for the synthesis of Au NR that utilizes two fluidic devices, 3D-3a and 3D-3b, to synthesis Au NP seeds and subsequently Au NRs, respectively, according to some embodiments of the present disclosure.

| Parameter | FIG. 8A (3D-1) | FIG. 8B (3D-1) | FIG. 9 (3D-1) | FIGS. 10A&10B (all designs) | 3 h flow (FIG. 11AB) (3D-3) |
|---|---|---|---|---|---|
| Au precursor flow rate [ml/min] | 11.8 | | 3.7 | | 11.5 |
| Ligand stabilizer flowrate [ml/min] | 11.8 | | 3.7 | | 11.5 |
| Reductant flow rate [ml/min] | 4.0 | | 0.9 | See text | 3.9 |
| Au precursor conc. [mM] | | | | 2.5 | 2.5 |
| Ligand stabilizer conc. [mM] | | | | 5.0 | 5.0 |
| Reductant conc. [mM] | | | | 25.0 | 25.0 |
| NaBH$_4$ [° C.] | 0 | 0 | 0 | 0 | 0 |
| Na$_3$Ct, HAuCl$_4$ [° C.] | 21 | 21 | 21 | 21 | 21 |
| Residence time (Rt) (min) | 3 | 0.25 | 3 | 3 | 0.27 |
| NP yield (%) | | 85 | | — | 95 |

Next, the reaction residence time was evaluated for the 3D-3 device (residence time for the combination of the fluidic device and the outlet tubing) to minimize the overall reaction time and maximize the quantity of Au NP seeds possible per day. The enhanced reagent mixing obtained by 3D-3 was hypothesized to permit relatively shorter Au NP flow reaction times while still maintaining high NP yields and the particle properties observed in the optimization experiments (from about 3 nm to about 5 nm). A range of residence times between 0.3 min and 3 min were investigated in small-scale, 1-hour duration continuous flow experiments (see Table 3 below). Briefly, the HAuCl$_4$ (2.5 mM), Na$_3$Ct (5 mM), and NaBH$_4$ (25 mM) were directed to the 3D-3 fluidic device at flow rates of 3.5-, 3.5-, and 1.2-mL min$^{-1}$, respectively. Due to the internal 416 mm channel length after the first zone in 3D-3, 0.26 minutes is the shortest residence time possible at these flow rates (i.e., at total flow of 8.2 mL min$^{-1}$ with no tubing attached to the outlet, residence time=0.26 min). To modify the residence time, the length of the tubing connected to the outlet of 3D-3 was decreased from 309 cm to 7 cm.

Notably, the outlet tubing was changed from Tygon (used in all 3D-1 experiments discussed above and optimization experiments (i.e., B/Au)) to fluorinated ethylene propylene (FEP) tubing as FEP tubing was experimentally determined to result in a significant reduction in fouling in comparison to other common tubing compositions (e.g., Tygon, polytetrafluoroethylene (PTFE) had increased fouling relative to FEP tubing after a 1-hour flow reaction, observed qualitatively by intensity of gold fouling observed by eye). The decreased tube fouling is likely a result of the decreased tube roughness and/or NP-tube electrostatic repulsion. Finally, the Au NPs from the residence time optimization experiments were supported onto Vulcan XC 72R where uniform dispersion of the Au NPs at relatively high weight loadings (target 25 wt % NP—Au/C) was achieved by directly releasing the NP solution into a 1 liter vessel containing an aqueous solution of Vulcan XC 72R stirring at 1300 RPM. After about 1 hour of stirring (i.e., 1 hour NP formation with immediate dispersion (during 1 hour of Au NP formation)), the NP—Au/C was recovered by decanting and centrifugating and analyzed by thermogravimetric analysis (TGA) to gain insight into the influence of residence time on NP yield. The results, shown in Table 3, revealed that varying the time between 0.3 min and 3 min afford Au NP yields ranging between about 84% and about 96%. As expected, the reaction with the longest residence time presents the highest yield of 96%. However, a 10-fold decrease in $R_t$ (0.3 min) still resulted in excellent Au NP yield of 87% (see Table 3). In addition, TEM analyses show no statistically significant change in the average particle diameter or the size distribution upon decreasing the residence time. These results confirm that reagent mixing is largely complete within the 3D-printed mixer, 3D-3, and that the residence time can be decreased in the continuous flow procedure.

TABLE 3

Consequence of varying residence time on particle properties and reaction efficiency. Reactions were conducted with 3D-3 with various lengths of FEP tubing unless otherwise noted.

| $R_t$ (min) | Tubing length (cm) | NP Yield (%)[a] | NP size (nm)[b] |
|---|---|---|---|
| 3 | 308.5 | 96 | 4.8 ± 1.3 |
| 2 | 200 | 88 | 4.5 ± 1.1 |
| 1 | 82 | 91 | 4.5 ± 1.1 |
| 0.5 | 27 | 84 | 4.0 ± 1.1 |
| 0.26 | 7 | 87 | 4.6 ± 1.3 |

[a]NP yield determined by thermogravimetric analysis (TGA).
[b]Au NP diameter determined by transmission electron microscopy (TEM). Size distributions were determined from a manual measurement of the particle diameter for > 100 particles.

With the 3D-3 B/Au and residence time conditions established for 3D-3, a 3-hour continuous flow experiment was conducted to assess the efficacy of the reactor configuration and optimized parameters at larger scales. The $HAuCl_4$/$Na_3Ct$ and $NaBH_4$ flow rates were set to 11.5 and 3.9 mL/min (B/Au=3.4), respectively, affording a theoretical Au NP throughput of 328 mg h-'. UV-Vis and TEM analyses of an aliquot taken during the 3-hour run showed $A_{LSPR}$ value of 2.8 (by UV-Vis) and average diameters of 3.8±0.9 nm, consistent with the screening studies, vide supra (see FIGS. 10A and 10B). Moreover, TGA of the 3-hour reaction using 3D-3 fluidic device design demonstrated an excellent Au NP seed yield of 95%. Overall, a significant procedural improvement was observed in comparison to previously reported batch and flow reactions, with higher precursor concentrations (1.25 mM $HAuCl_4$) and higher yield (95%) resulting in a throughput of about 312 mg Au NPs $h^{-1}$.

During synthesis, the Au NPs were directly supported onto Vulcan XC 72R at a target 25 wt % loading following the procedure outlined above. After 3 hours of stirring at 1300 RPM (i.e., simultaneous 3 hour NP formation time and 3 hour dispersion time, 3.4 g of NP—Au/C catalyst was recovered by decanting and centrifugating (26.7 wt % Au loading, as confirmed by TGA). TEM analysis of the final NP—Au/C catalyst showed an average diameter of 4.0±0.9 nm, revealing a negligible size increase, relative to the unsupported Au NPs, over the 3 hours supporting time.

the fluidic devices and systems described above were next evaluated for their ability to produce Au nanorods (NRs). First, the concentrations of the Au NP seed precursors added to a first mF fluidic device, labeled 3D-3a in FIG. 11 were set to 0.50 mM $HAuCl_4$ (first component), 1.0 mM $Na_3Ct$ (second component), and 22 mM $NaBH_4$ (third component). Further, to decrease the total flow rate of the 3D-3a outlet seed solution, the $HAuCl_4$, $Na_3Ct$, and $NaBH_4$ flow rates were set to 1.1, 1.1, and 0.38 mL $min^{-1}$, respectively (total flow rate: 2.6 mL $min^{-1}$). Finally, the Au NP seed residence time ($R_t$) in the first fluidic device (3D-3a) and 3D-3a outlet tubing was increased to about 12 minutes to increase the precursor mixing at slower flow rates and decreased turbulence.

Referring again to FIG. 11, the system was expanded to include a second fluidic device, labeled 3D-3b, where the Au NP seeds from the outlet of the first fluidic device, 3D-3a, were directly introduced to an inlet of the second fluidic device, 3D-3b. To dilute the concentration of Au NP seeds further, DI $H_2O$ was introduced to the second fluidic device, 3D-3b, via a separate inlet and pre-mixed with the Au NP seeds in a first zone having four runs, each with several right-angle mixing elements. Finally, the growth solution was added to the diluted Au NP seeds using a third inlet. The total 3D-3b residence time for Au NR formation, including time in the 3D-3b and the outlet tubing, was set to 9 minutes based on the hypothesis that enhanced reagent mixing would permit decreased reaction time, relative to that used in previously reported flow-synthesized Au NRs which generally utilize a residence between 15 and 25 min, without negatively influencing the product properties. Here, the 3D-3b residence time, which is based on the total flow rate of the reaction, was controlled by the 322 cm length of the FEP tubing with ID of 12.7 mm.

Figure 12A:
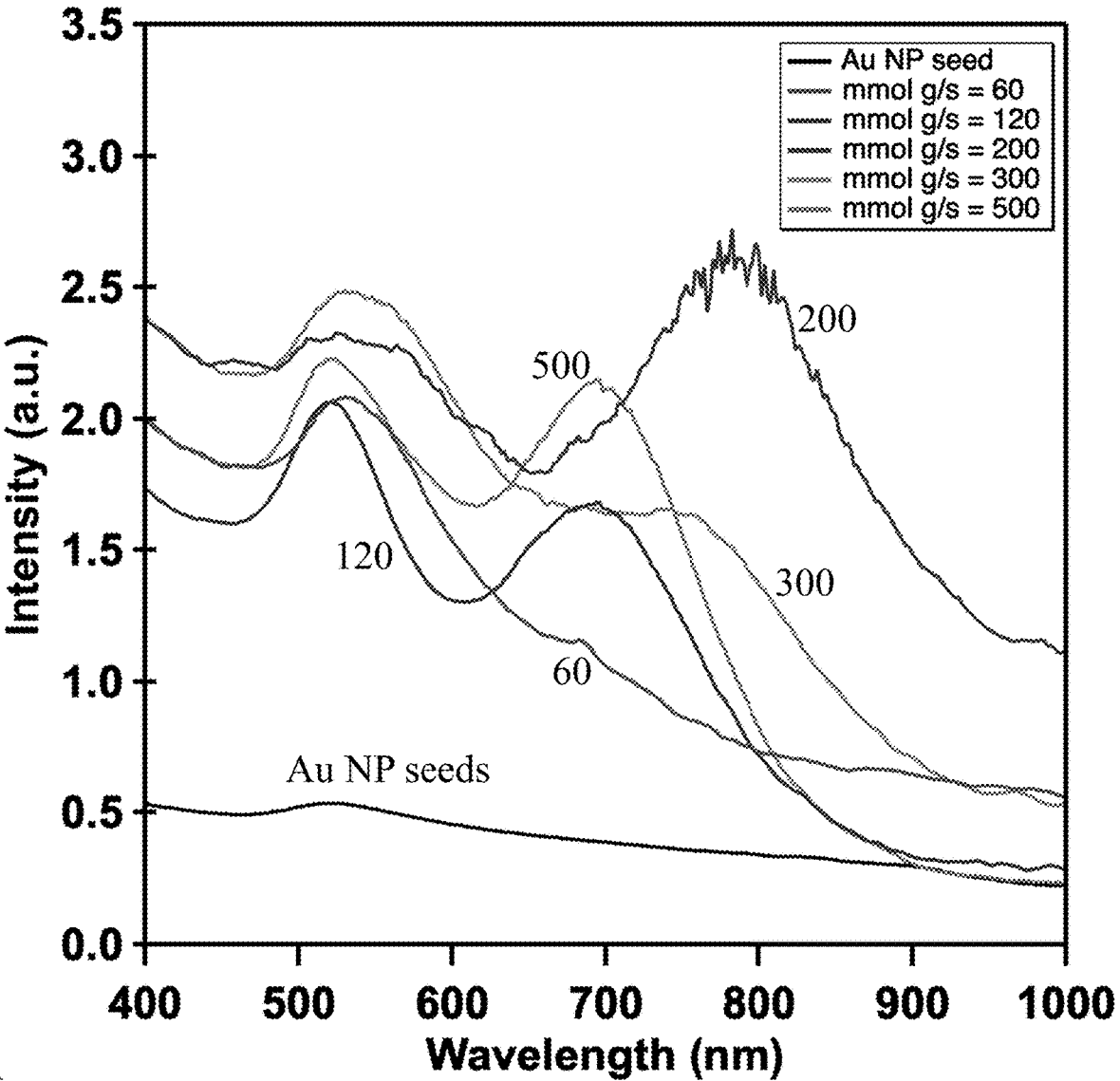
FIG. 12A illustrates UV-Vis data of from an experiment utilizing the lowest relative quantity of Au(III)$_{growth}$ (mmol g/s=60) up to 500 mmol g/s, according to some embodiments of the present disclosure. The units of the numbers labeling the curves are mmol g/s.
Figure 12B:
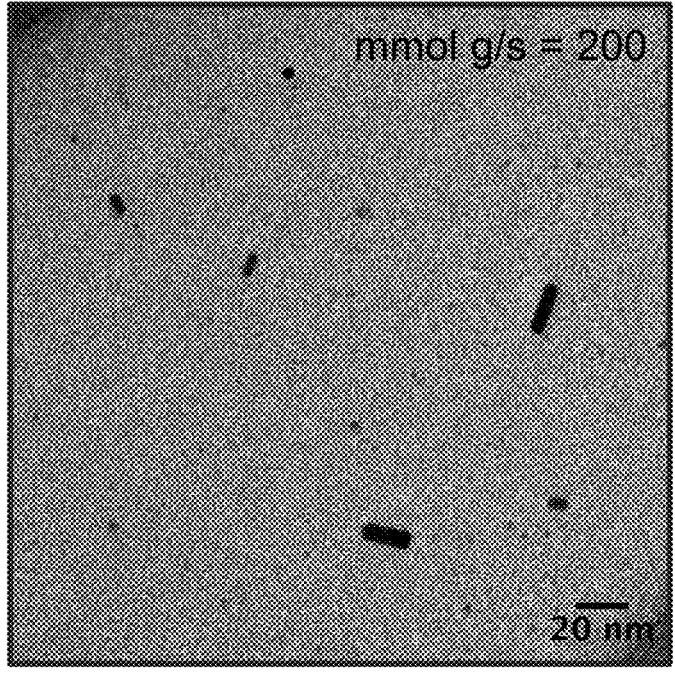
FIG. 12B illustrates TEM images of NPs resulting from the experiment corresponding to FIG. 12A, according to some embodiments of the present disclosure.

Molar ratios used were: 64 equiv. CTAB, 2.5 equiv. Ascorbic acid (AA), and 0.04 equiv. $AgNO_3$ (equiv. ratios relative to the molar quantity of $HAuCl_4$ in the growth solution ($Au(III)_{growth}$)). Given the broad range of $Au(III)_{growth}$: Au NP seed observed in the literature (generally ranging between 4 to 1000), herein referred to as mmol g/s, a range of mmol g/s between 60 and 500 were tested by modifying the flow rate of the seed solution. These optimization studies were analyzed by UV-Vis spectroscopy where the intensity and ratio of the longitudinal (LSPR-L; 700-900 nm) and transverse (LSPR-T; 500-600 nm) absorption bands informs the relative quantity of Au NPs/NRs and the location of the LSPR-L informs on the NR aspect ratios (AR). UV-Vis analysis of an aliquot of flow synthesized Au NRs at the lowest relative quantity of $Au(III)_{growth}$ (mmol g/s=60) showed negligible formation of Au NRs (see FIG. 12A). Increasing the mmol g/s to 120 resulted in NR formation, as observed by the increased LSPR-L absorbance band at about 700 nm. However, the intensity of the LSPR-T at 520 nm was higher than that of LSPR-L which suggests the retention of a large quantity of Au NPs (LSPR-L:T=0.8). A slight increase in the molar ratio of g/s from 120 to 200 resulted in a bathochromic shift in the LSPR-L to 785 nm and an increase in intensity relative to the LSPR-T (LSPR-L: T=1.1). These results suggest formation of Au NRs with aspect ratios (AR) around 3 and a higher concentration of Au NRs, respectively. Notably, further increasing the mmol g/s to 300 resulted in a significant decrease in LSPR-L and a slight increase in LSPR-T. Finally, investigating an even higher mmol g/s of 500 resulted in a blue-shifted LSPR-L, suggestive of NRs with decreased AR, with a LSPR-L:T intensity ratio of 1:1. Collectively, these results suggest mmol g/s=200 as the conditions leading to maximum quantity of Au NRs with AR of about 3. Size analysis of the Au NRs synthesized with mmol g/s=200 by TEM (see FIG. 12B) revealed that these conditions resulted in NRs with lengths of 14.2±5.5 nm, widths of 5.4±0.9 nm. Notably, about 36% of the particles imaged had spherical morphologies with sizes of 5.6±1.9 nm.

Figure 13A:
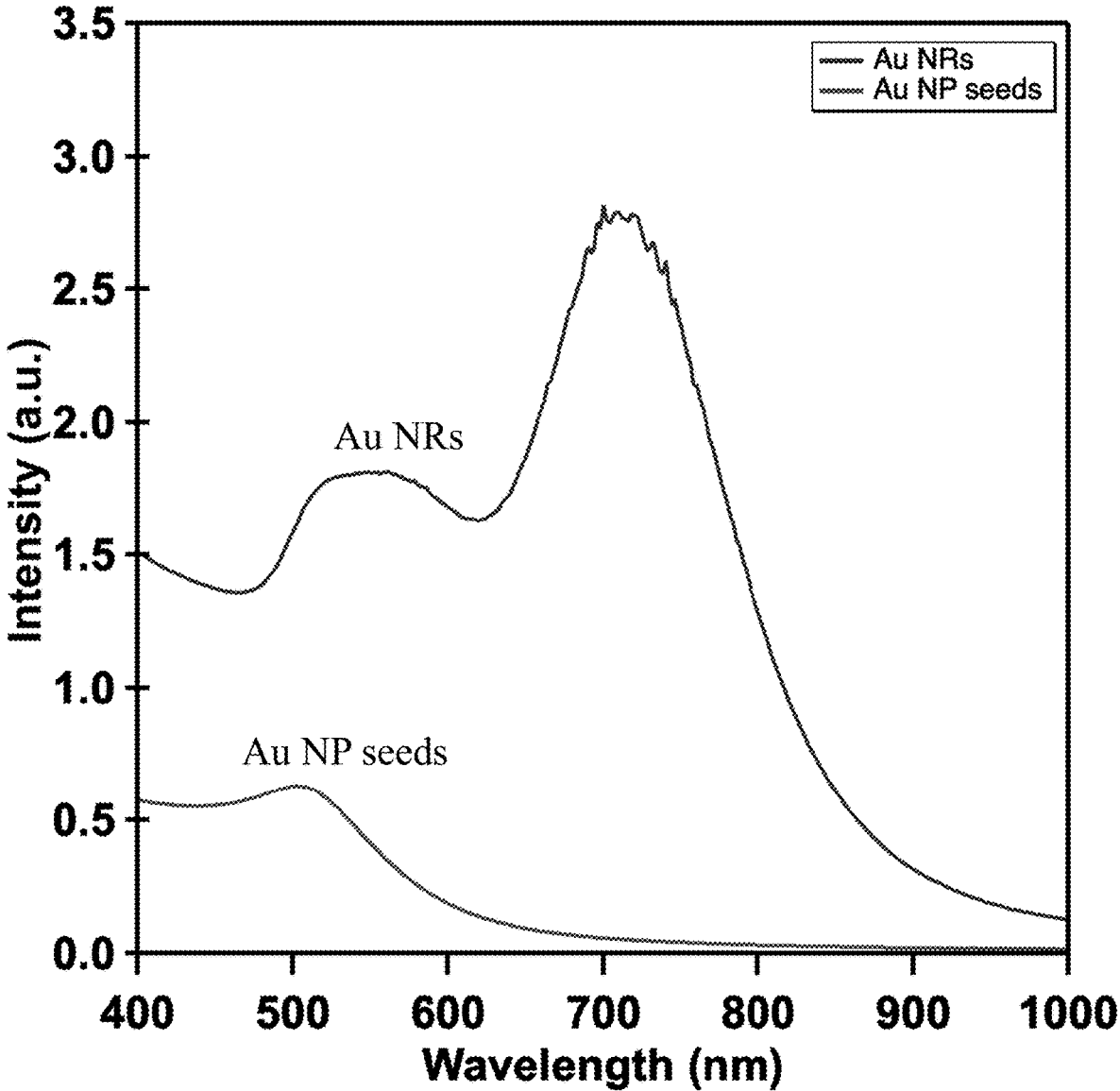
FIG. 13A illustrates UV-Vis analysis showing a high intensity absorption band at 716 nm with an LSPR-L:T ratio of ca. 1.5, according to some embodiments of the present disclosure.
Figure 13B:
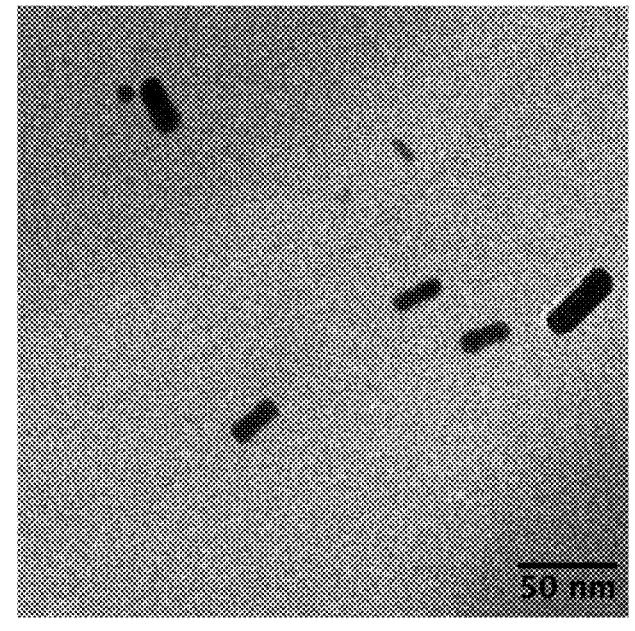
FIG. 13B illustrates TEM images of NPs resulting from the experiment corresponding to FIG. 13A, according to some embodiments of the present disclosure.
Figure 14A:
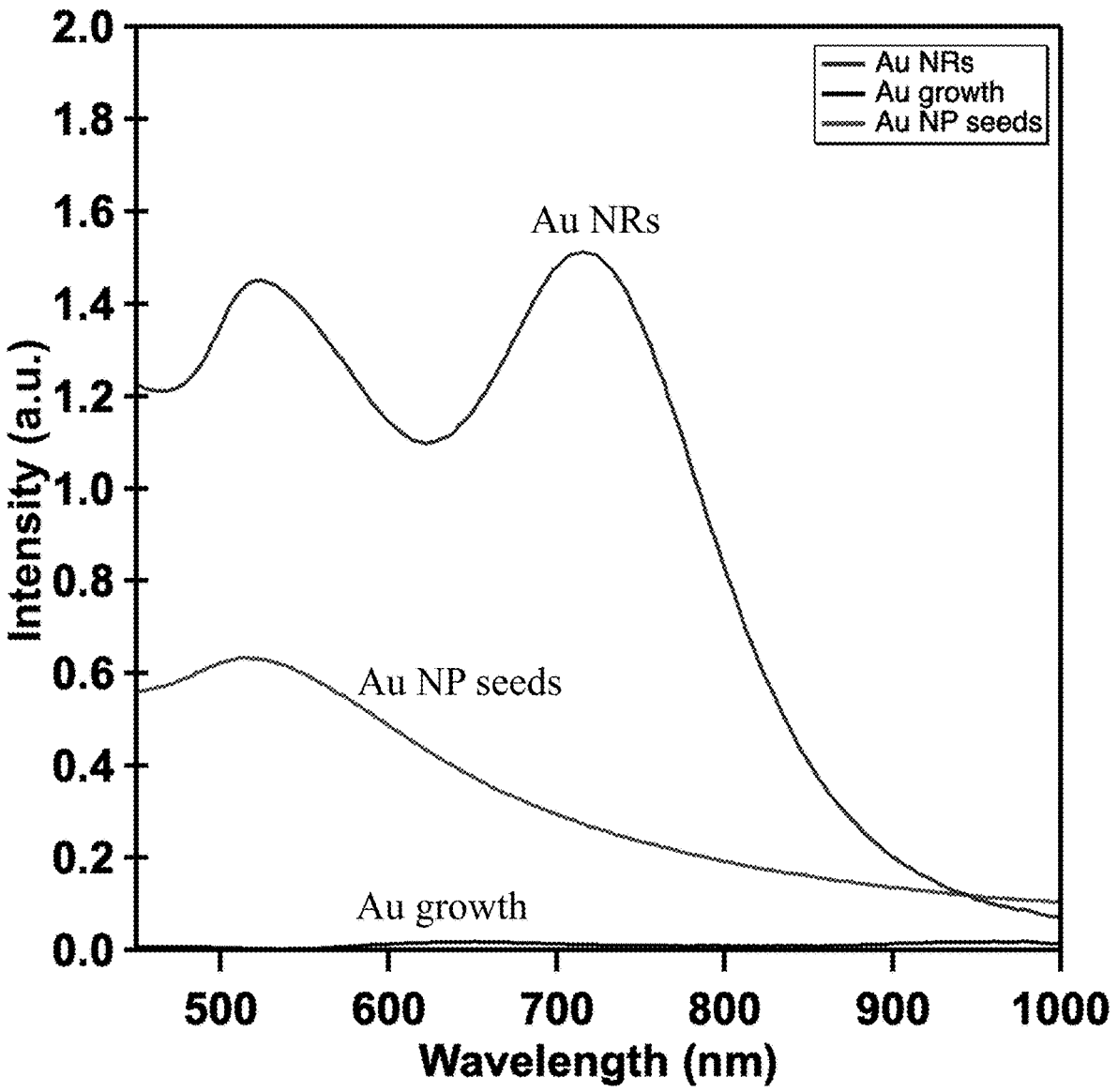
FIG. 14A illustrates UV-Vis analysis showing a high intensity absorption band at 720 nm with an LSPR-L:T ratio of 1.0, according to some embodiments of the present disclosure.
Figure 14B:
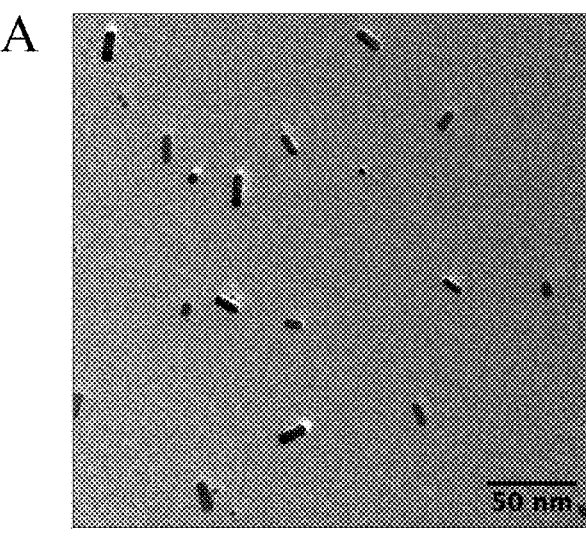
FIG. 14B illustrates TEM images of NPs resulting from the experiment corresponding to FIG. 14A, according to some embodiments of the present disclosure.

With a set of suitable operating conditions established for synthesizing Au NRs, a 30-minute continuous flow experiment was conducted to assess the optimized parameters at a larger scale. Briefly, referring again to FIG. 11, the Au seed NPs were introduced into the second fluidic device (3D-3b) at the first inlet using the conditions outlined above (2.6 mL $min^{-1}$ total flow rate, residence time (3D-3a)=12 minutes). The NPs were diluted by a factor of 2 using $H_2O$, introduced into the first zone at the second inlet, at a flow rate of 2.5 mL min[−1]. Finally, the growth solution, which contained a mixture of $HAuCl_4$ (mmol g/s=200), CTAB (64 eq.), $AgNO_3$ (0.04 eq.), and AA (2.5 eq.), was added at the third inlet at a flow rate of 40.4 mL min[−1]. The Au NP seeds, $H_2O$, and growth solution were mixed in about 320 cm of 12.7 mm FEP tubing to achieve a residence time (3D-3b) of 9 minutes. Notably, the total residence time includes 12 minutes for Au NP seed formation (3D-3a+3D-3a outlet tubing) and 9 minutes for Au NR formation (3D-3b+3D-3b outlet tubing). The flow reaction described herein was run for 9 minutes, equating to a total reaction time of about 30 minutes). UV-Vis analysis showed a high intensity absorption band at 716 nm with an LSPR-L:T ratio of ca. 1.5 (see FIG. 13A). TEM imaging revealed a slight increase in NR width in comparison to the Au NRs synthesized in the small-scale optimization experiments previously discussed (9.5±2.7 nm, 5.4±0.9 nm, respectively: see FIG. 13B). However, both the length (21.5±6.3 nm) and AR (2.3±0.5) were within statistical error between the two reactions. Spherical NPs with average diameters of 9.4±6.6 nm were observed with a shape yield of 48% which was 12% higher than that of the initial NR flow experiment. Given the slight variability in NR width, NP size, and the shape yield, the reaction was repeated in duplicate to gain insight into the reproducibility of the NR flow reaction. The results, summarized in Table 4 reveal that the NR flow conditions utilized herein result in NRs with average lengths of 18.3±6.3 nm and widths of 7.4±2.3 nm. An average of 60% of the particle sized were Au NRs, with the remaining 40% of particles being spherical Au NPs with average diameters of 8.3±5.1 nm. Collectively, these results confirm that the Au NR flow procedure reproducibly results in the formation of NR with aspect ratios of 2.5±0.6 and in higher shape yields (% NR) than typically reported for NR syntheses using citrate-stabilized seeds.

that observed in the 30 min flow experiments. TEM analysis reveals a slight decrease in the average diameter and length of the NRs synthesized in the 30 min flow reaction, however the NR properties were consistent with those obtained from the optimization experiments, (see Table 4 'small scale' run). Specifically, the NRs had average lengths of 14.2±3.6 nm, widths of 5.7±1.0 nm, and AR of 2.5±0.5 nm. Like that observed in preliminary small-scale flow experiment, unreacted spherical NPs with average diameters of 5.7±2.6 nm remained in the NR sample with a shape yield of 32%. Notably the low % Au NPs determined by TEM (see Panel A of FIG. 14B) is inconsistent with the UV-Vis spectra that showed a higher relative retention of seeds. This inconsistency is likely due to a relatively increased amount of <1 nm Au NR seeds that were not included in the sizing of Au NRs (see Panel B of FIG. 14B). Collectively, these results suggest that slight variation in NR properties and shape yield is expected with modification in the reaction scale albeit in each case explored, the average AR remained at about 2.5.

Given that a significant excess of CTAB was used in the synthesis of Au NRs (CTAB: Au(III)$_{growth}$=64), the dispersion procedure as described above for flow-synthesized Au NPs was modified to include steps aimed at removing excess CTAB. Briefly, the Au NR solution was pumped directly into a vessel containing an aqueous solution of Vulcan XC 72R. 5 vol % methanol (MeOH) was added to the aqueous solution as CTAB is reported to have high solubility in polar protic solvents. The aqueous carbon-NR suspension was stirred for a total time of 1 hour (i.e., dispersion beginning during 36 minutes NR collection plus an additional 24 minutes of stirring for a total time of 1 hour) at 1300 RPM, after which about 14.0 g of the NR—Au/C catalyst was recovered by centrifugation. The high product mass, coupled with silver color of the NR—Au/C suggested retention of a large quantity of CTAB in the final product. Given the high solubility of CTAB in $CHCl_3$, the NR—Au/C was stirred in

TABLE 4

Reproducibility of Au NR flow reactions.

| Run[a] | LSPR-L:T[b] | N[c] | Length (nm) | Width (nm) | AR | Au NP diameter (nm) | Shape yield (% NR) |
|---|---|---|---|---|---|---|---|
| Small-scale[d] | 1.1 | 159 | 14.2 ± 5.5 | 5.4 ± 0.9 | 2.6 ± 0.7 | 5.6 ± 1.9 | 64% |
| Run 1 | 1.4 | 330 | 16.0 ± 4.7 | 6.6 ± 1.1 | 2.4 ± 0.6 | 7.9 ± 4.1 | 52% |
| Run 2[e] | 1.5 | 193 | 21.5 ± 6.3 | 9.5 ± 2.7 | 2.3 ± 0.5 | 9.5 ± 2.7 | 52% |
| Run 3 | 1.5 | 462 | 20.6 ± 6.0 | 8.2 ± 2.2 | 2.5 ± 0.3 | 10.3 ± 5.7 | 68% |
| Average(1-3) | — | — | 19.1 ± 6.1 | 7.9 ± 2.3 | 2.5 ± 0.6 | 8.8 ± 5.3 | 57% |
| Large-scale[f] | 1.0 | 295 | 14.2 ± 3.6 | 5.7 ± 1.0 | 2.5 ± 0.5 | 5.7 ± 2.6 | 68% |

[a]Unless otherwise notes, Au NR flow experiments ran for 30 min.
[b]The ratio of the longitudinal (LSPR-L) and transverse (LSPR-T) absorption bands were determined by UV-Vis spectroscopy.
[c]N, or number of particles sized, includes both NRs and NPs.
[d]Small-scale refers to initial optimization experiment investigating the consequence of varying mmol g/s.
[e]'Run 2' refers to experiment discussed in detail in manuscript.
[f]large-scale refers to 1 h experiment discussed in detail in manuscript. Notably, a relatively large amount of Au NPs ≤1 nm were observed and not included in the size analysis, rendering Au NP diameters and shape yield higher and lower, respectively, than actual.

Finally, a 1-hour Au NR continuous flow experiment (i.e., 12 min residence time for Au NP seed formation, 9 min residence time for Au NR formation, Au NR collection time of about 35 minutes) was conducted to obtain larger catalyst quantities. The seed formation (3D-3a; 2.6 mL min' total flow rate) and growth addition (3D-3b, 40.4 mL min') procedure used for the 1 liter reaction was the same as the 30 minute flow experiment outlined above. UV-Vis analysis showed a high intensity absorption band at 720 nm with an LSPR-L:T ratio of 1.0 (see FIG. 14A). The lower relative LSPR-L:T suggests the retention for more Au NP seeds that ca. 400 mL $CHCl_3$ and centrifuged, resulting in 794 mg of the NR catalyst (1.7 wt % Au loading, 21.6% CTAB loading, as confirmed by TGA).

Figure 15:
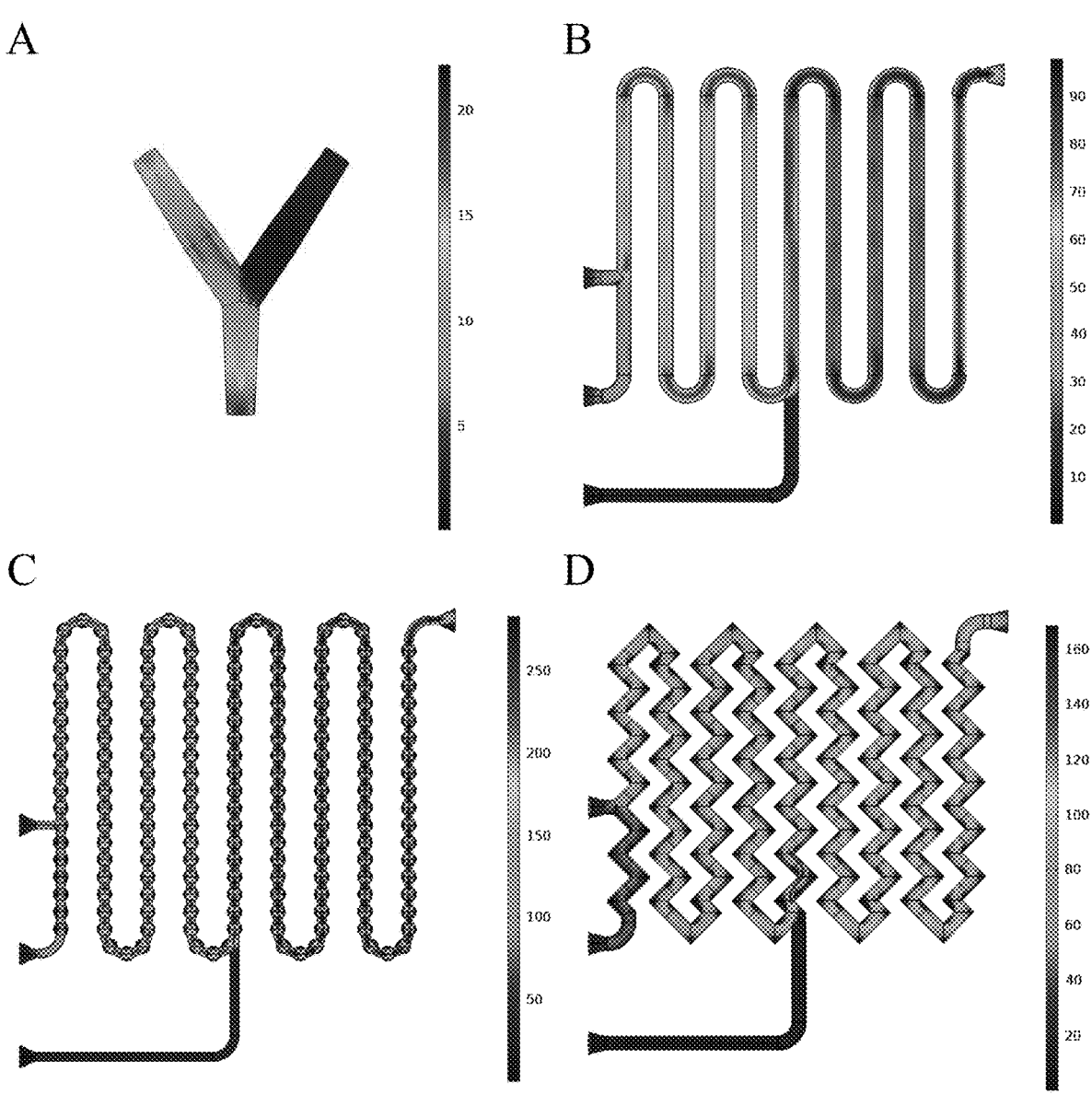
FIG. 15 illustrates computational fluid dynamic (CFD) simulation results, velocity plots, obtained for the fluidic device designs reported herein, according to some embodiments of the present disclosure. Panel A: Y-mixer; Panel B: design 3D-1; Panel C: design 3D-2; and Panel D: design 3D-3.
Figure 16:
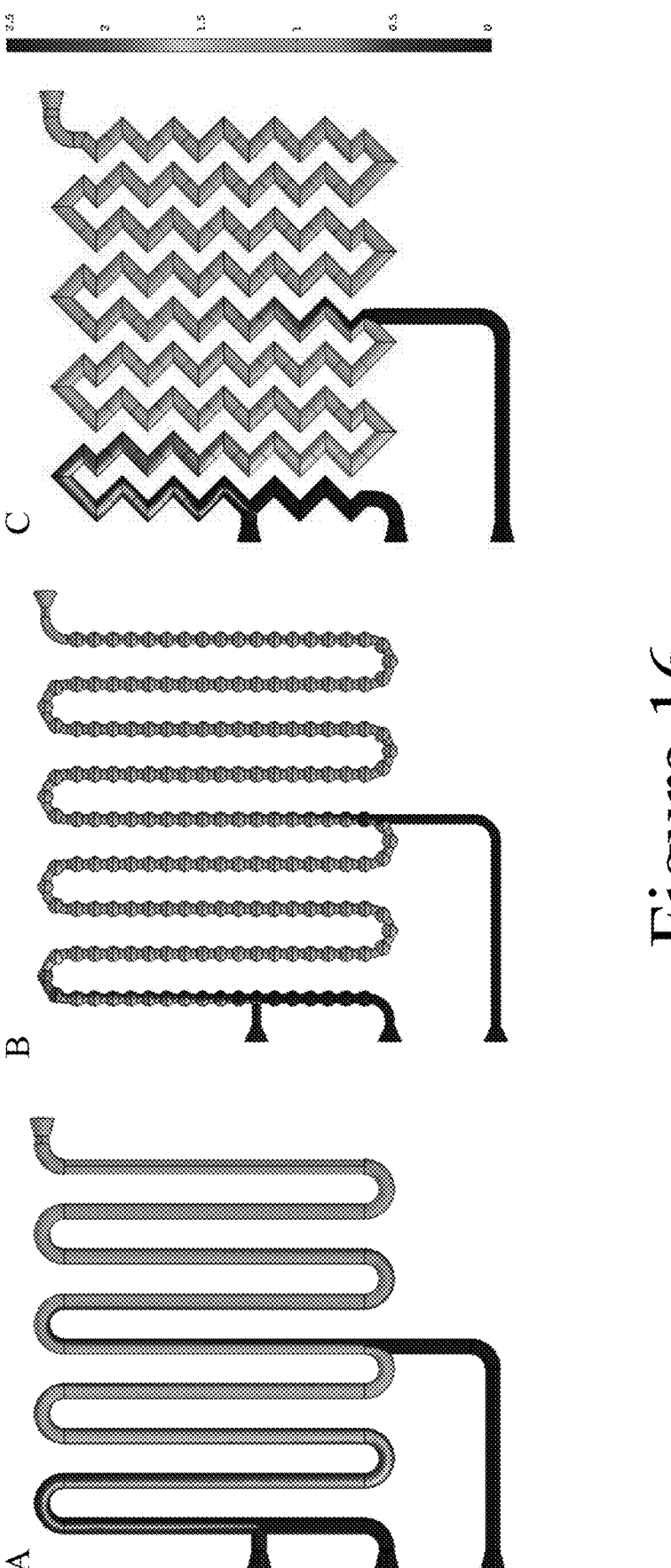
FIG. 16 illustrates computational fluid dynamic (CFD) simulation results, concentration gradients, obtained for the fluidic device designs reported herein, according to some embodiments of the present disclosure. Panel A: design 3D-1; Panel B: design 3D-2; and Panel C: design 3D-3.

As described above, fluid flow through the fluidic devices described herein is estimated to be laminar flow, with Reynold's numbers much less than 3,500. However, experimental results indicate that significant mixing is nevertheless attained, as evidenced by the formation of metal particles having a relatively narrow size distribution. This mixing is provided by the mixing elements and bends provided in the fluidic devices, which was validated by computational fluid dynamic (CFD) simulations. CFD modeling was completed for a Y-junction, and each of the 3D-1, 3D-2, and 3D-3 fluidic device designs, using COMSOL Multiphysics 6.0 (using the following program settings for stationary steady-state mixing with 'heat transfer in fluids (ht)', 'transport of dilute species (tds)', and 'turbulent flow (spf) modules'). 3D CAD files were used to upload the 3D-printed geometries for a Y-junction, and the 3D-1, 3D-2, and 3D-3 fluidic device designs to COMSOL. The inlets and outlets were partitioned via the 'partition domains' function. Physics controlled mesh with fine element size was applied to all models to generate a mesh that met the needs of the calculations. For calculations of mixing within the Y-junction, a diluted solution of $HAuCl_4$ of 1.25 mM was used to simulate the $HAuCl_4$ concentration after pre-mixing with a 5.0 mM $Na_3Ct$ solution at equal flow rates. Similarly, the flow rate of the $HAuCl_4$ inlet was doubled to account for the introduction of a pre-mixed $HAuCl_4/Na_3Ct$ solution (25° C.). $NaBH_4$ was introduced to the second inlet at 0° C. The concentrations, flow rates, and temperatures used in the calculations of reagent mixing within 3D-1, 3D-2, and 3D-3 were set to the experimentally defined parameters. FIG. 15 illustrates velocity profiles obtained via CFD for the various fluidic device designs. FIG. 16 illustrates concentration profiles of $HAuCl_4$, which show complete or nearly complete mixing was attained in each of the 3D-1, 3D-2, and 3D-3 fluidic device designs, even with the relatively short residence times provide by each for mixing.

Experimental Methods

General. Hydrogen tetrachloroaurate(III) trihydrate ($HAuCl_4 \cdot 3H_2O$) was purchased from Sigma-Aldrich and stored in an $N_2$-filled Vacuum Atmospheres glovebox. Sodium borohydride ($NaBH_4$) and trisodium citrate ($Na_3Ct$) were purchased from Sigma-Aldrich and used as received. The carbon support (Vulcan XC 72R) was supplied by Cabot and used as received. Deionized (DI) 18.2 MΩ $H_2O$ was obtained using an EASYpure II ultrapure water purification system.

Millifluidic Synthesis of NP—Au/C. Stock solutions of $Na_3Ct$ (5.0 mM, 2 L) and $HAuCl_4$ (2.5 mM, 2 L) were prepared in DI $H_2O$. $NaBH_4$ (25 mM) was dissolved in 300 mL of DI $H_2O$ and cooled to 0° C. in an ice bath. The cooled $NaBH_4$ solution was replaced with a fresh 25 mM solution every ca. 1 h. A portion of activated carbon (Vulcan XC72R; target 25 wt % Au) was dispersed in 300 mL of DI $H_2O$ and manually agitated in a 500 mL Nalgene bottle for ca. 10 minutes to pre-wet the carbon support. The aqueous carbon mixture was then transferred to a separate 5.5-gallon vessel and diluted with 0.5 gallons of DI $H_2O$ where the solution was stirred at 400 RPM using an overhead mixer (model X) affixed with a PTFE paddle mixer. Three peristaltic pumps equipped with easy load II pump heads (Cole-Palmer Masterflex) were used to introduce the reagent solutions to 3D-3; the $HAuCl_4$ and $Na_3Ct$ pumps were set to 11.5 mL $min^{-1}$ and the $NaBH_4$ pump was set to 3.9 mL $min^{-1}$ (B/Au=3.4). The $HAuCl_4$ and $Na_3Ct$ solutions were attached to inlets 1 and 2, respectively, for pre-mixing in the initial 4-loop channel of 3D-3 (see Figure Xa for inlet labelling). The 0° C. $NaBH_4$ solution was added to the mixer viaa inlet 3. 65 cm of FEP tubing (3.1 mm ID) was attached to the outlet of the mixers, where the reagents were mixed for a residence time of 0.26 minutes. The Au NP product stream was periodically analyzed via UV-Vis spectroscopy, whereby NP size was estimated by analyzing the ratio of absorbance at the surface plasmon resonance ($A_{LSPR}$) to the absorbance at 450 nm ($A_{450}$) (see SI for more details).[104] Following elution from the 65 cm tubing, the Au NP solution was released directly into a 5.5-gallon vessel containing the carbon support in 0.5 gal $H_2O$. The supporting mixture was stirred for 3 h (i.e., simultaneous 3 h NP formation time and 3 h dispersion time) then allowed to settle for ca. 1 h. The bulk of the mother liquor was drawn off from the supported material with a peristaltic pump and the remaining slurry was centrifuged at 8000 RPM to recover 3.4 g NP—Au/C catalyst (95% yield, 26.7 wt % Au).

Millifluidic Synthesis of NR—Au/C. Two stock solutions of CTAB (0.09 M, 64 equiv, 900 mL DI $H_2O$; all equiv listed are relative to $Au(III)_{growth}$), were prepared in 1 L vessels and heated to 32° C. in a water bath overnight to dissolve the surfactant. The CTAB solutions were removed from the 32° C. bath and cooled to warm temperature before use. Two stock growth solutions were made by adding $HAuCl_4$ (1.4 mM, mmol g/s=200, 42 mL) to each 20° C. CTAB solution and stirred until the solutions became red-orange and then clear. 5.3 mL of an $AgNO_3$ stock solution (0.06 mM, 0.04 equiv,) was added to both solutions and stirred for ca. 5 min. Then 3.3 mL of ascorbic acid (AA, 3.5 mM, 2.5 equiv.) was added to one of the growth solutions and stirred until clear and colorless (ca. 2 min). The second growth solution (CTAB, $HAuCl_4$, and $AgNO_3$) was allowed to stir for ca. 20 min at 20° C. (i.e., no AA addition until second growth stock solution is needed, see below). Stock solutions of $Na_3Ct$ (1.0 mM, 200 mL) and $HAuCl_4$ (0.5 mM, 200 mL) were prepared in DI $H_2O$. $NaBH_4$ (23 mM) was dissolved in 150 mL of DI $H_2O$ and cooled to 0° C. in an ice bath. A portion of activated carbon (Vulcan XC72R; target 25 wt % Au and CTAB) was dispersed in 425 mL of DI $H_2O$ and 25 mL MeOH (5 vol %) in a 4 L vessel and stirred at 1300 RPM for ca. 10 minutes to pre-wet the carbon support. Two peristaltic pumps equipped with easy load II pump heads (Cole-Palmer Masterflex; $HAuCl_4$, $Na_3Ct$) and one syringe pump (New Era syringe pump; $NaBH_4$) were used to introduce the Au NP seed precursors to 3D-3a. The $HAuCl_4$ and $Na_3Ct$ peristaltic pumps were set to 1.1 mL $min^{-1}$ and the $NaBH_4$ syringe pump was set to 0.38 mL $min^{-1}$ (B/Au=1.5). The $HAuCl_4$ and $Na_3Ct$ solutions were attached to inlets 1 and 2, respectively, for pre-mixing in the initial 4-loop channel of 3D-3a (see Figure Xa for inlet labelling). The 0° C. $NaBH_4$ solution was added to 3D-3a via inlet 3. 380 cm of FEP tubing (3.1 mm ID) was attached to the outlet of 3D-3a, where the reagents were mixed for a residence time of 11.8 min. The 380 cm 3D-3a outlet tubing was connected to inlet 1 of a second mixer, 3D-3b. An additional two peristaltic pumps equipped with easy load II pump heads (Cole-Palmer Masterflex; $H_2O$, growth solution) were used to introduce the Au NR precursors to 3D-3b. $H_2O$ was added to 3D-3b at inlet 2 using a peristaltic pump set to 2.5 mL $min^{-1}$ and the growth solution was added to 3D-3b at inlet 3 using a peristaltic pump set to 40.4 mL $min^{-1}$. 322 cm of FEP tubing (12.7 mm ID) was attached to the outlet of 3D-3b, where the reagents were mixed for a residence time of 9 min. After about 15 minutes after the Au NRs started eluting into the carbon-$H_2O$/MeOH mixture, 3.3 mL of ascorbic acid (3.5 mM, 2.5 equiv.) was added to the second ca. 950 mL CTAB solution and stirred until colorless 2 minutes. At about 20 minutes, the initial growth solution was replaced by swapping the 1 L jar without stopping the flow reaction and the reaction ran for an additional 16 minutes. The Au NR product stream was periodically analyzed via UV-Vis spectroscopy, whereby the intensity and ratio of the longitudinal (LSPR-L; 700-900 nm) and transverse (LSPR-T; 500-600 nm) absorption bands informed on the relative quantity of Au NPs/NRs and the location of the LSPR-L informs on the NR AR.

Synthesis of carbon-supported Au NRs (NR—Au/C). Following elution from the 322 cm tubing, the Au NR solution was released directly into a 4 L vessel containing the carbon support in 425 mL H$_2$O and 25 mL MeOH. The supporting mixture was stirred for an additional 24 min (i.e., simultaneous 36 min NR formation time and support time for a total 1 h dispersion time) then allowed to settle for ca. 1 h. The remaining slurry was centrifuged at 8000 RPM and the supernatant was discarded. 14.06 g NR—Au/C catalyst was collected and dried overnight. The product was then stirred in ca. 400 mL CHCl$_3$ to remove excess CTAB. The slurry was centrifuged at 8000 RPM and the supernatant was discarded. 794 mg NR—Au/C catalyst (1.7 wt % Au, 21.6 wt % CTAB) was collected and dried overnight.

Passive mixer design and SLA fabrication. 3D CAD drawing were prepared using Solidworks software and exported as stereolithography files (.STL file) for interpretation by the Preform 3D-printing software. The 3D models of the fluidic devices were oriented about 80° from the build plate to minimize printing defects and eliminate the need for internal supports. Supports were automatically generated by the preform software with a density parameter of 0.6. All parts were printed with a layer resolution of 0.5 mm using Formlabs Clear Resin V2 on a Form3 SLA printer. The uncured parts were separated from the print bed and manually rinsed with isopropanol. The internal channels of the fluidic devices were purged with isopropanol by affixing all ports with luer-lock compatible syringes followed by washing in a Form Wash system charged with isopropyl alcohol for 20 min. Finally, the washed prints were cured under 405 nm UV light at 60° C. in the Form Cure for 30 min.

Materials characterization. Electronic absorption measurements were recorded at room temperature in DI H$_2$O in a sealed 1 cm quartz cuvette with an Agilent Cary 50 UV-vis spectrophotometer. Samples for transmission electron microscopy (TEM) were drop-cast onto carbon-coated copper grids (Au NPs, Ted Pella part no. 01824) or Lacey Carbon (Au/C, Ted Pella part no. 01895-F) from aqueous suspensions. Imaging was performed using a FEI Technai G2 ST30 TEM operating at 300 kV. All image analysis was conducted with ImageJ software. Size distributions were determined from a manual measurement of the particle diameter for >100 particles. Metal loadings were determined by inductively coupled plasma optical emission spectroscopy (ICP-OES) and the Au and B content was determined by Galbraith Laboratories (Knoxville, TN) or Hazen Research Inc. (Golden, CO).

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target. As used herein, the terms "characteristic length", "characteristic width", and "characteristic diameter" refer to the situation where a particle or particles may not have a specific three-dimensional shape such as a sphere or cube that is simply defined by a specific diameter or length. In some cases, a particle or collection of particles may have an amorphous, irregular shape defined by a length measurement, that on average, provides a reasonable "characteristic" measurement for quantifying the size of the particles. This generalized measurement is referred to herein as the particle's "characteristic length", characteristic width", and/or "characteristic diameter".

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device comprising:
a channel constructed of at least two runs fluidly connected in series by a bend;
a first inlet fluidly connected to a first end of the channel,
an outlet fluidly connected to a second end of the channel,
a second inlet fluidly connected to the channel between the first inlet and the outlet, and
a third inlet fluidly connected to the channel between the second inlet and the outlet, wherein:
the channel has a diameter between 0.1 mm and 10 mm, and
at least one run comprises an additional bend positioned therein.

2. The device of claim 1, wherein each run is positioned substantially parallel to adjacent runs.

3. The device of claim 1, wherein the bend connecting the runs redirects the channel by about 180 degrees.

4. The device of claim 1, wherein the number of runs is between 2 and 100 runs.

5. The device of claim 1, wherein at least one run has between 2 and 100 additional bends.

6. The device of claim 1, wherein the additional bend redirects the run by about 90 degrees.

7. The device of claim 1, further comprising a narrowing in the diameter of the channel, followed by a widening in the diameter of the channel.

8. The device of claim 1, wherein the channel is positioned within a block of material.

9. The device of claim 8, wherein the material comprises at least one of a plastic, a ceramic, a glass, or a metal.

10. The device of claim 8, wherein the material is capable of operating at a temperature between 0° C. and 200° C.

11. The device of claim 8, wherein the material is capable of operating at a pressure between one atmosphere and ten atmospheres of absolute pressure.

12. The device of claim 1, wherein the channel has a volume between 100 ml and 10,000 ml.

13. The device of claim 1, wherein the channel has a length between 10 mm and 10,000 mm.

14. The device of claim 1, wherein the channel is configured to provide laminar flow, with water flowing through the channel at a flow rate between 1 ml/min and 100 ml/min.

15. A system comprising:
a first fluidic device comprising:
a channel constructed of at least two runs fluidly connected in series by a bend;
a first inlet fluidly connected to a first end of the channel,
an outlet fluidly connected to a second end of the channel,
a second inlet fluidly connected to the channel between the first inlet and the outlet, and a third inlet fluidly connected to the channel between the second inlet and the outlet, wherein:
the channel has a diameter between 0.1 mm and 10 mm, and
at least one run comprises an additional bend positioned therein; and
a second fluidic device, wherein:
the first fluidic device and the second fluidic device are connected in series by a union.

16. The system of claim 15, wherein the second fluidic device comprises a channel having a narrowing in a diameter of the channel, followed by a widening in the diameter of the channel.

17. The system of claim 15, wherein the second fluidic device comprises a channel constructed of at least two runs fluidly connected in series by a bend.

18. A method of synthesizing metal nanoparticles, the method comprising:
mixing a metal precursor with a stabilizing ligand in a first zone of a first fluidic device to form a first mixture; and
combining the first mixture with a reductant in a second zone of the first fluidic device to form a second mixture, wherein:
the metal nanoparticles form in the second zone, and
the first fluidic device comprises:
a channel constructed of at least two runs fluidly connected in series by a bend;
a first inlet fluidly connected to a first end of the channel,
an outlet fluidly connected to a second end of the channel,
a second inlet fluidly connected to the channel between the first inlet and the outlet, and
a third inlet fluidly connected to the channel between the second inlet and the outlet, wherein:
the channel has a diameter between 0.1 mm and 10 mm, and
at least one run comprises an additional bend positioned in the run.

19. The method of claim 18, wherein the metal nanoparticles have a substantially spherical shape with an average diameter between about 1 nm and about 10 nm.

20. The method of claim 19, further comprising:
directing the second mixture from the first fluidic device to a second fluidic device,
mixing in a first zone of the second fluidic device the second mixture with a diluting liquid to form a third mixture, and
combining in a second zone of the second fluidic device the third mixture with a liquid comprising the metal precursor, wherein:
at least a portion of the spherical metal nanoparticles are transformed into nanorods.

21. The method of claim 18, wherein laminar flow is maintained in the first fluidic device.

* * * * *